(12) United States Patent
Takahashi et al.

(10) Patent No.: US 9,618,863 B2
(45) Date of Patent: Apr. 11, 2017

(54) TONER, DEVELOPER AND METHOD OF MANUFACTURING TONER

(71) Applicants: Satoshi Takahashi, Kanagawa (JP); Yoshihiro Moriya, Shizuoka (JP); Satoshi Kojima, Shizuoka (JP); Masahiko Ishikawa, Shizuoka (JP); Tatsuki Yamaguchi, Shizuoka (JP)

(72) Inventors: Satoshi Takahashi, Kanagawa (JP); Yoshihiro Moriya, Shizuoka (JP); Satoshi Kojima, Shizuoka (JP); Masahiko Ishikawa, Shizuoka (JP); Tatsuki Yamaguchi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/928,797

(22) Filed: Oct. 30, 2015

(65) Prior Publication Data
US 2016/0124332 A1     May 5, 2016

(30) Foreign Application Priority Data

Nov. 4, 2014   (JP) .................................. 2014-224097

(51) Int. Cl.
*G03G 9/087*    (2006.01)
*G03G 9/08*     (2006.01)

(52) U.S. Cl.
CPC ......... *G03G 9/0827* (2013.01); *G03G 9/0804* (2013.01); *G03G 9/0819* (2013.01); *G03G 9/0821* (2013.01); *G03G 9/08795* (2013.01)

(58) Field of Classification Search
CPC ..................... G03G 9/087; G03G 9/08755
See application file for complete search history.

(56) References Cited

U.S. PATENT DOCUMENTS

| | | | |
|---|---|---|---|
| 7,695,878 | B2 | 4/2010 | Seshita et al. |
| 8,043,778 | B2 | 10/2011 | Nagatomo et al. |
| 8,105,743 | B2 | 1/2012 | Ishii et al. |
| 8,658,340 | B2 | 2/2014 | Sakashita et al. |
| 8,673,534 | B2 | 3/2014 | Katoh et al. |
| 8,679,714 | B2 | 3/2014 | Inoue et al. |
| 8,679,723 | B2 | 3/2014 | Masuda et al. |
| 8,685,604 | B2 | 4/2014 | Moriya et al. |
| 8,735,040 | B2 | 5/2014 | Amemori et al. |

(Continued)

FOREIGN PATENT DOCUMENTS

| | | |
|---|---|---|
| JP | 63-030862 | 2/1988 |
| JP | 07-152202 | 6/1995 |

(Continued)

OTHER PUBLICATIONS

Machine English language translation of JP 2011232454 Nov. 17, 2011.*

(Continued)

*Primary Examiner* — Hoa V Le
(74) *Attorney, Agent, or Firm* — Oblon, McClelland, Maier & Neustadt, L.L.P.

(57) ABSTRACT

A toner is provided. The toner includes a binder resin, a colorant, a release agent and an external additive. The toner has an average circularity of from 0.965 to less than 0.985. The toner has BET specific surface area of less than 1.20 $m^2/g$ after liberation treatment of external additive.

14 Claims, 8 Drawing Sheets

(56) References Cited

U.S. PATENT DOCUMENTS

| | | |
|---|---|---|
| 8,828,635 B2 | 9/2014 | Moriya et al. |
| 8,877,415 B2 | 11/2014 | Yamashita et al. |
| 8,932,790 B2 | 1/2015 | Yamauchi et al. |
| 8,956,795 B2 | 2/2015 | Kojima et al. |
| 9,005,864 B2 | 4/2015 | Satoh et al. |
| 9,012,116 B2 | 4/2015 | Yamashita et al. |
| 9,056,296 B2 | 6/2015 | Takahashi et al. |
| 9,086,647 B2 | 7/2015 | Sakashita et al. |
| 9,128,397 B2 | 9/2015 | Nakajima et al. |
| 9,141,010 B2 | 9/2015 | Katoh et al. |
| 9,141,013 B2 | 9/2015 | Moriya et al. |
| 9,170,508 B2 | 10/2015 | Katoh et al. |
| 9,170,511 B2 | 10/2015 | Moritani et al. |
| 2004/0152006 A1* | 8/2004 | Teshima ............... G03G 9/0804 430/109.4 |
| 2006/0154167 A1* | 7/2006 | Lee ...................... G03G 9/0804 430/109.3 |
| 2006/0210909 A1* | 9/2006 | Ohtani ................... B01J 2/006 430/137.1 |
| 2008/0227002 A1 | 9/2008 | Moriya et al. |
| 2008/0227011 A1* | 9/2008 | Kuramoto ............ G03G 9/0804 430/108.3 |
| 2009/0003885 A1 | 1/2009 | Sabu et al. |
| 2009/0142094 A1 | 6/2009 | Sawada et al. |
| 2010/0119255 A1 | 5/2010 | Seshita et al. |
| 2011/0124838 A1 | 5/2011 | Kotsugai et al. |
| 2013/0149642 A1 | 6/2013 | Sabu et al. |
| 2013/0243488 A1 | 9/2013 | Kojima et al. |
| 2014/0140731 A1 | 5/2014 | Hozumi et al. |
| 2014/0220485 A1 | 8/2014 | Kojima et al. |
| 2014/0234767 A1 | 8/2014 | Awamura et al. |
| 2014/0242514 A1 | 8/2014 | Inoue et al. |
| 2015/0104739 A1 | 4/2015 | Nagatomo et al. |
| 2015/0108671 A1 | 4/2015 | Norikane et al. |
| 2015/0234303 A1 | 8/2015 | Moriya et al. |
| 2015/0241804 A1 | 8/2015 | Takahashi et al. |
| 2015/0253686 A1 | 9/2015 | Miyakoshi et al. |
| 2015/0261111 A1 | 9/2015 | Inoue et al. |

FOREIGN PATENT DOCUMENTS

| | | | |
|---|---|---|---|
| JP | 09-043905 | 2/1997 | |
| JP | 2005-049858 | 2/2005 | |
| JP | 2008-233406 | 10/2008 | |
| JP | 2008-242416 | 10/2008 | |
| JP | 2011-033916 | 2/2011 | |
| JP | 2011-033986 | 2/2011 | |
| JP | 2011-212668 | 10/2011 | |
| JP | 2011232454 | * 11/2011 | ............... G03G 8/08 |
| JP | 2012-008510 | 1/2012 | |

OTHER PUBLICATIONS

U.S. Appl. No. 14/669,230, filed Mar. 25, 2015 First Inventor: Moriya, et al.
U.S. Appl. No. 14/669,230, filed Mar. 26, 2015, Moriya, et al.

* cited by examiner

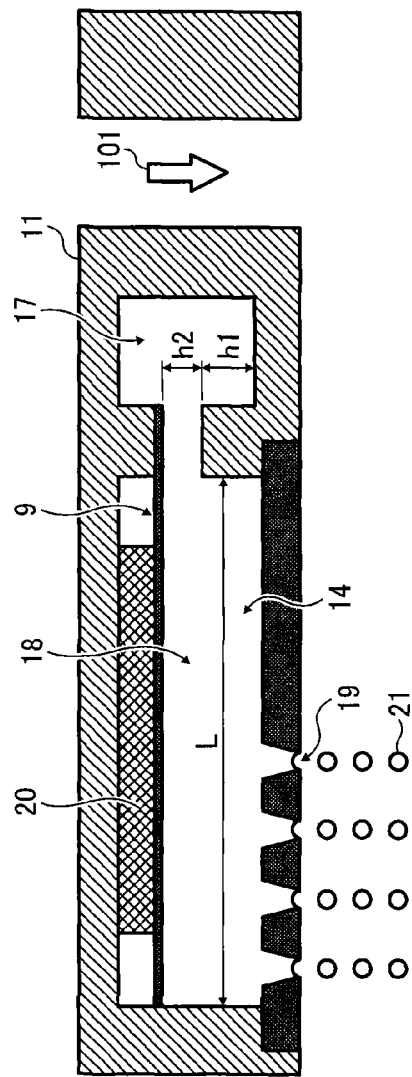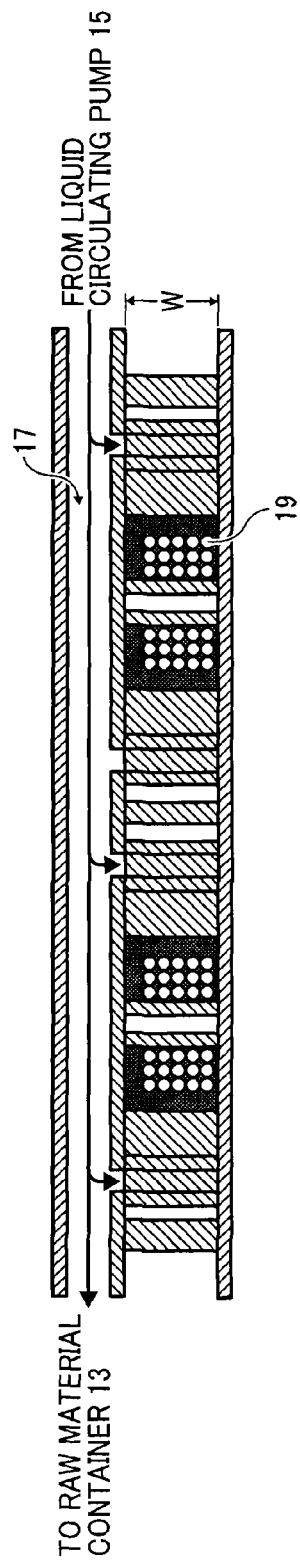

DIRECTION OF AIRFLOW

TONER, DEVELOPER AND METHOD OF MANUFACTURING TONER

CROSS-REFERENCE TO RELATED APPLICATIONS

This patent application is based on and claims priority pursuant to 35 U.S.C. §119(a) to Japanese Patent Application Nos. 2014-224097, filed on Nov. 4, 2014, respectively, in the Japan Patent Office, the entire disclosure of each of which is hereby incorporated by reference herein.

BACKGROUND

Technical Field

The present disclosure relates to a toner, a developer using the toner and a method of manufacturing toner.

Description of the Related Art

In electrophotography, electrostatic recording, electrostatic printing, etc., a toner is once adhered to a latent image bearer, such as an electrostatic latent image bearer, on which an electrostatic latent image has been formed in a process called developing process. The toner is then transferred from the electrostatic latent image bearer onto a transfer medium such as paper in a process called transfer process. The toner is then fixed on the transfer medium in a process called fixing process.

Recently, a polymerization toner produced by a suspension polymerization method and another toner produced by a polymer dissolution suspension method that causes volume contraction have been proposed. In order to give a toner chargeability and flowability in a developing unit and improve transfer property and prevent the toner from blocking each other, it is disclosed to combine an external additive with the polymerization toner. For example, the external additive is inorganic fine particles or organic fine particle.

A certain amount of toner particles remains on the latent image bearer without being transferred. Such residual toner particles should be removed from the latent image bearer so as not to prevent formation of a next electrostatic latent image. As a means for removing the residual toner particles, a blade cleaner is widely used, which has a simple configuration and high cleaning ability. It is known that as the shape of toner gets close to a sphere, it becomes more difficult to remove such toner and clean the latent image bearer. It is known that a layered compounds or inorganic filler is localized in the vicinity of the outer side of the toner so that the toner can be formed into an irregular shape in the suspension polymerization method.

In the above method of producing an irregular-shaped toner, a fine irregular structure on a surface of mother toner particles (particles not covered with any external additive) increases and BET specific surface area of the toner increases. And the external additive moves into concave portions of a surface of the mother toner particles. So an effective coverage of an external additive reduces. Consequently, in order to effect functions of flowability, chargeability and blocking resistance, it is necessary to combine the mother toner particles with a large amount of the external additive.

When a large amount of the external additive is added to the mother toner particles, flowability, chargeability and blocking resistance tend to increase, but retardation of fixation or following trouble are likely to occur.

(1) It changes substantially a developer charge amount that the free external additive adhere to a charging member such as carrier.

(2) It makes larger surface energy of a latent image bearer that the free external additive adheres to the latent image bearer.

Consequently, an output image is affected by toner filming.

(3) It makes larger surface energy of a developer holding member that the free external additive adhere to the developer holding member.

Consequently, an output image is affected by toner filming.

The toner made by a injection granulation method have been proposed instead of the polymerization toner. In the Injection granulation methods, raw materials of toner are dissolved or dispersed in an organic solvent, the resulting liquid (hereinafter "toner constituents liquid") is discharged from uniform and fine discharge holes. And the discharged liquid droplets are dried into toner particles in a gas flow. This method can produce toner particles having a very narrow particle size distribution, because the toner constituents liquid is discharged from fine discharge holes. Also, this method can produce toner particles having a very narrow shape distribution, because a dissolving component or a dispersing component is included uniformly in the liquid droplet.

In the Injection granulation methods, a binder resin is used as the dissolving component, so a particle is soft as a whole. Consequently, the external additive will become easy to be embedded in mother toner particles. Furthermore, the liquid droplets are dried into toner particles in a gas flow in an instant, so the mother toner particles will become easy to have a truly spherical shape. When using toners having a truly spherical shape or a close truly spherical shape, there arises a problem in cleaning ability of the toners at the developing process. Against this, It is proposed that a shape of the toner is controlled by including a crystalline compound as the dissolving component or the dispersing component in the toner constituents liquid.

However, a surface of the mother toner has a fine irregular structure or wrinkles by forming into the irregular shape toner by the crystalline compound. So, BET specific surface area of the toner increases. When BET specific surface area of the toner increases, the effective coverage of an external additive reduces. So, it is necessary to combine the mother toner particles with a large amount of the external additive. When a large amount of the external additive is added to the mother toner particles, the above-mentioned troubles are likely to occur. Furthermore, the toner is likely to crush from the interface of the crystalline compound on the surface of the toner.

There are various ways of reducing BET specific surface area of the toner. For example, it is proposed to treat the toner with heat or solvent. However, when the toner is treated with heat or solvent, the toner likely adhere to each other. So, the toner particles have a wide particle size distribution. Also, there is concern that the release agent in the toner bleed to the surface of the toner.

In order to improve transfer efficiency, it is proposed to control the adhesive force by adjusting the circularity or BET specific surface area of the toner into a specified value. However, this relate to the polymerization toner. Further improvements are required in the particle size distribution or the shape distribution.

From the above, toner particles having a narrow particle size distribution, an irregular shape and small BET specific surface area are required.

SUMMARY

In accordance with some embodiments of the present invention, a toner is provided.

The toner includes a binder resin, a colorant, a release agent and an external additive. The toner has an average circularity of from 0.965 to less than 0.985. The toner has BET specific surface area of less than 1.20 m²/g after liberation treatment of external additive.

In accordance with some embodiments of the present invention, a developer is provided. The developer includes the above toner. In accordance with some embodiments of the present invention, a method of manufacturing toner is provided.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a cross-sectional view of a liquid column resonance liquid droplet forming device in accordance with some embodiments of the present invention;

FIG. 2 is a cross-sectional view of a liquid droplet formation unit in accordance with some embodiments of the present invention;

DETAILED DESCRIPTION

Figure 3A:
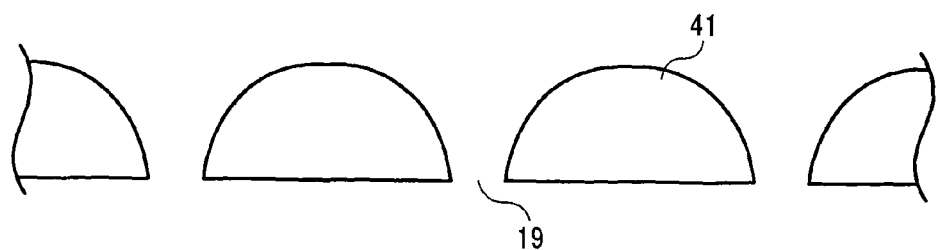
FIGS. 3A to 3D are schematic cross-sectional views of the discharge holes of the liquid column resonance liquid chamber in accordance with some embodiments of the present invention.
Figure 3B:
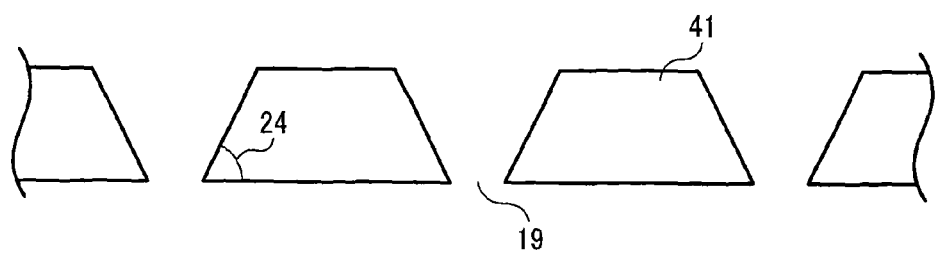
Figure 3C:
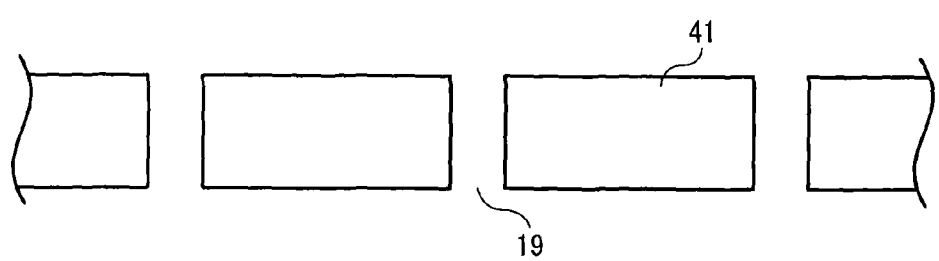
Figure 3D:
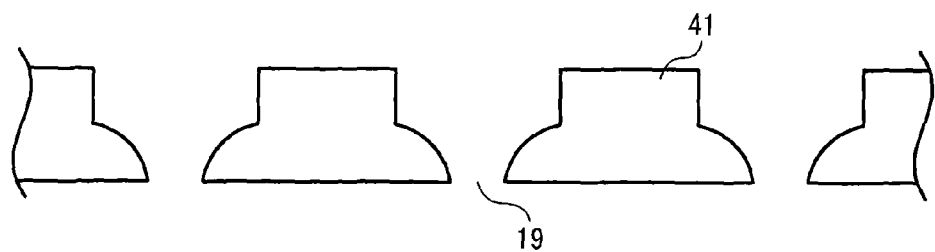

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. For the sake of simplicity, the same reference number will be given to identical constituent elements such as parts and materials having the same functions and redundant descriptions thereof omitted unless otherwise stated. One object of the present invention is to provide a toner which has an irregular shape and small BET specific surface area without treatment with heat or solvent, and has low-temperature fixability, flowability and chargeability, and can maintain high transfer efficiency.

In accordance with some embodiments of the present invention, a toner is provided which has an irregular shape and small BET specific surface area without treatment with heat or solvent, and has low-temperature fixability, flowability and chargeability, and can maintain high transfer efficiency. In addition, even if quantity of an external additive is fewer than a conventional toner, the toner has low-temperature fixability, flowability and chargeability, and can maintain high transfer efficiency. Furthermore, the generation of system problems by a free external additive in electrophotographic system can be decreased.

The toner according to an embodiment of the present invention includes a binder resin, a colorant, a release agent and an external additive. The toner has an average circularity of from 0.965 to less than 0.985. The toner has BET specific surface area of less than 1.20 m²/g after liberation treatment of external additive.

Toner

The toner according to some embodiments of the present invention includes at least a binder, a colorant, a release agent and an external additive, and optionally other components such as a charge controlling agent and a leveling agent.

Binder Resin

The binder resin is not limited to any particular material. Specific examples of the binder resin include, but are not limited to, a vinyl polymer or copolymer obtainable from a styrene monomer, an acrylic monomer, and/or a methacrylic monomer, polyester resin, polyol resin, phenol resin, silicone resin, polyurethane resin, polyamide resin, furan resin, epoxy resin, xylene resin, terpene resin, coumarone indene resin, polycarbonate resin, and petroleum resin. For example, in a case in which the toner is produced by a later-described method in which toner compositions are dissolved or dispersed in an organic solvent, an organic-solvent-soluble resin can be used as the binder resin. Two or more of these resins can be used in combination.

Preferably, a molecular weight distribution of the binder resin which is measured by gel permeation chromatography (GPC) has at least one peak within a molecular weight range of from 3,000 to 50,000, more preferably from 5,000 to 20,000, from the viewpoint of fixability and offset resistance of the toner. Preferably, the binder resin contains THF (tetrahydrofuran) solubles having a molecular weight of 100,000 or more in an amount of from 60% to 100%. Preferably, the binder resin has an acid value of from 0.1 mgKOH/g to 50 mgKOH/g. The acid value of the binder resin can be measured based on a method according to JIS K-0070.

Release Agent

The release agent is not limited to any particular material. Specific examples of the release agent include, but are not limited to, aliphatic hydrocarbon waxes (e.g., low-molecular-weight polyethylene, low-molecular-weight polypropylene, polyolefin wax, microcrystalline wax, paraffin wax, SASOL wax), oxides of aliphatic hydrocarbon waxes (e.g., oxidized polyethylene wax) and block copolymers thereof, plant waxes (e.g., candelilla wax, carnauba wax, sumac wax, jojoba wax), animal waxes (e.g., bees wax, lanolin, spermaceti), mineral waxes (e.g., ozokerite, ceresin, petrolatum), waxes mainly composed of fatty acid esters (e.g., montanate wax, castor wax), and partially or completely deoxidized fatty acid esters (e.g., deoxidized carnauba wax). For example, in a case in which the toner is produced by a later-described method in which toner compositions are dissolved or dispersed in an organic solvent, an organic-solvent-soluble release agent can be used as the release agent. Two or more of these release agents can be used in combination.

The release agent is not limited in melting point. The release agent preferably has a melting point of from 70° C. to 140° C., more preferably from 70° C. to 120° C., for achieving a good balance between fixability and offset resistance. When the melting point is less than 70° C., blocking resistance may deteriorate. When the melting point exceeds 140° C., offset resistance may not express very well.

The melting point of the release agent is defined as a temperature at which the maximum endothermic peak is observed in an endothermic curve of the release agent measured by DSC (differential scanning calorimetry).

Preferably, the melting point of the release agent or toner is measured with a high-precision inner-heat power-compensation differential scanning calorimeter based on a method according to ASTM D3418-82. The endothermic curve is obtained by preliminarily heating and cooling a sample to remove its thermal history and then heating the sample at a heating rate of 10° C./min.

Colorant

The colorant is not limited to any particular material and selected in accordance with the intended purpose. The content of the colorant is preferably from 1% to 15% by mass, more preferably from 3% to 10% by mass, based on total weight of the toner.

The colorant can be combined with a resin to be used as a master batch. The master batch can be obtained by mixing and kneading a resin and a colorant while applying a high shearing force. The resin for use in the master batch is not limited to any particular material and selected in accordance with the intended purpose. Two or more resins can be used in combination. The content of the master batch is preferably from 0.1 parts to 20 parts by mass based on 100 parts by mass of the binder resin.

When preparing the master batch, a dispersant may be used to improve dispersibility of colorant. Dispersants having high affinity for the binder resin are preferable from the viewpoint of colorant dispersibility. Specific examples of such dispersants include, but are not limited to, commercially available dispersants such as AJISPER PB821 and PB822 (from Ajinomoto Fine-Techno Co., Inc.), DISPER-BYK-2001 (from BYK-Chemie GmbH), and EFKA-4010 (from EFKA).

The addition amount of the colorant dispersant is preferably from 1 part to 200 parts by mass, more preferably from 5 parts to 80 parts by mass, based on 100 parts by mass of the colorant. When the addition amount is less than 1 part by mass, colorant dispersibility may deteriorate. When the addition amount exceeds 200 parts by mass, chargeability may deteriorate.

External Additive

The toner include an external additive. The external additive improves flowability of the toner by existing at the surface of the toner. Specific examples of the external additive include, but are not limited to, a fine powder of silica prepared by a wet process or a dry process; fine powders of metal oxides such as titanium oxide and alumina; and fine powders of silica, titanium oxide, and alumina which are surface-treated with a silane-coupling agent, a titanium-coupling agent, or a silicone oil; and fine powders of fluorocarbon resins such as vinylidene fluoride and polytetrafluoroethylene. Among these materials, fine powders of silica, titanium oxide, and alumina are preferable. In addition, a fine powder of silica which is surface-treated with a silane-coupling agent or a silicone oil is preferable.

The external additive preferably has an average primary particle diameter of from 0.001 µm to 2 µm and more preferably from 0.002 µm to 0.2 µm.

The fine powder of silica can be obtained by gas phase oxidation of a silicon halide, and is generally called as dry-method silica or fumed silica. Specific examples of commercially available fine powder of silica obtained by gas phase oxidation of a silicon halide include, but are not limited to, AEROSIL-130, -300, -380, -TT600, -MOX170, -MOX80, and -COK84 (from Nippon Aerosil Co., Ltd.); CAB-O-SIL -M-5, -MS-7, -MS-75, -HS-5, and -EH-5 (from Cabot Corporation); WACKER HDK -N20V15, -N20E, -T30, and -T40 (from Wacker Chemie AG); D-C Fine Silica (from Dow Corning Corporation); and Fransol (from Fransil).

In addition, a fine powder of hydrophobized silica, obtained by hydrophobizing the fine powder of silica obtained by gas phase oxidation of a silicon halide, is also preferable. The hydrophobized silica preferably has a hydrophobicity degree of from 30% to 80% measured by a methanol titration test. Hydrophobicity is given by chemically or physically treating a fine powder of silica with a material which is reactive with or adsorptive to the silica, such as an organic silicon compound. Treating the fine powder of silica obtained by gas phase oxidation of a silicon halide with an organic silicon compound is preferable.

Specific examples of the organic silicon compound include, but are not limited to, hydroxypropyltrimethoxysilane, phenyltrimethoxysilane, n-hexadecyltrimethoxysilane, n-octadecyltrimethoxysilane, vinylmethoxysilane, vinyltriethoxysilane, vinyltriacetoxysilane, dimethylvinylchlorosilane, divinylchlorosilane, γ-methacryloxypropyltrimethoxysilane, hexamethyldisilane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilylmercaptan, trimethylsilylmercaptan, triorganosilyl acrylate, vinylmethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexamethyldisiloxane, 1,3-divinyltetramethyldisiloxane, 1,3-diphenyltetramethyldisiloxane, and dimethylpolysiloxane having at least 2 and at most 12 siloxane units per molecule and 0 or 1 hydroxyl group bonded to Si in each terminal unit. Other than the above compounds, silicone oils such as dimethyl silicone oil are also usable. Two or more of these compounds can be used in combination.

Other Components

The toner according to some embodiments of the present invention may optionally include other components such as a charge controlling agent and a leveling agent.

Charge Controlling Agent

Specific examples of the charge controlling agent include, but are not limited to, nigrosine dyes, triphenylmethane dyes, chromium-containing metal complex dyes, chelate pigments of molybdic acid, Rhodamine dyes, alkoxyamines, quaternary ammonium salts (including fluorine-modified quaternary ammonium salts), alkylamides, phosphor and phosphor-containing compounds, tungsten and tungsten-containing compounds, fluorine activators, metal salts of salicylic acid, and metal salts of salicylic acid derivatives. Two or more of these resins can be used in combination.

Leveling Agent

Specific examples of the leveling agent include, but are not limited to, a silicone-based leveling agent, an acrylic-based leveling agent, a vinyl-based leveling agent and an fluorine-based leveling agent. Two or more of these compounds can be used in combination.

Specific examples of the silicone-based leveling agent include, but are not limited to, BYK-306, BYK-310, BYK-345, BYK-346, BYK-347, BYK-348 and BYK-349 (from BYK company). Specific examples of the acrylic-based leveling agent include, but are not limited to, BYK-354 (from BYK company). Specific examples of the vinyl-based leveling agent include, but are not limited to, BYK-UV3500, BYK-UV3505, BYK-UV3530, BYK-UV3570, BYK-UV3275 and BYK-UV3576(from BYK company). Specific examples of the fluorine-based leveling agent include, but are not limited to, BYK-3440(from BYK company), F-114, F-251,F-281,F-410,F-430,F-444,F-477,F-510,F-511,F-552, F-553,F-554,F-555,F-556,F-557,F-559,F-560,RS-90,RS-76-NS,RS-76-E,RS-75,RS-72-K,R-94,R-43,R-41,R-40,F-571,F-570,F-569,F-568,F-567,F-565,F-563,F-562,F-561 (from DIC Corporation).

In the Injection granulation methods, the discharged liquid droplets are dried into toner particles in an instant, so the control of a shape of toner is difficult. The mother toner particles will become easy to have a truly spherical shape. When using toners having the truly spherical shape or the close truly spherical shape, there arises a problem in cleaning ability of the toners at the developing process, so an output image is affected. Against this, the shape of the toner is controlled by including a crystalline compound in the toner constituents liquid. The toner can be formed into an irregular shape as a whole in accordance with the shape of crystallized crystalline compound in a drying step. However, a fine irregular structure on the surface of mother toner particles increases and BET specific surface area of the toner increases. When the mother toner has BET specific surface area of 1.20 $m^2$/g or more, an effective coverage of an external additive reduces, furthermore, the toner is likely to crush from the fine interface of the crystalline compound on the surface of the toner.

It is possible to obtain high surface smoothness in a state of keeping the irregular shape as a whole by adding the leveling agent having low surface tension. It is possible to reduce BET specific surface area and increase an effective coverage of an external additive and prevent the toner from crushing, by adding the leveling agent having low surface tension. The addition amount of the leveling agent is preferably from 0.1 parts to 2.0 parts by mass, based on 100 parts by mass of the mother toner particles. When the addition amount is less than 0.1 parts by weight, the leveling agent may not do work enough. When the addition amount exceeds 2.0 parts by weight, the mother toner particles may not be formed into an irregular shape by large reduction in surface tension during a granulation.

Toner Properties

The toner according to an embodiment of the present invention has an average circularity of from 0.965 to less than 0.985. And the toner has BET specific surface area of less than 1.20 $m^2$/g after liberation treatment of external additive. When BET specific surface area after liberation treatment of external additive is 1.20 $m^2$/g or more, a coverage of the external additive reduces. So, it is necessary to combine the mother toner particles with a large amount of the external additive. When a large amount of the external additive is added to the mother toner particles, the toner filming is likely to occur or insufficient effects of low-temperature fixability and transferability are provided. Furthermore, the toner is likely to crush from the fine interface of the crystalline compound on the surface of the toner. There may be similarity between BET specific surface area under a condition where the external additive is removed and BET specific surface area of the mother toner. However, these values are distinguished.

An example of a method for removing the external additive is shown below. A nonionic surfactant such as polyoxyethylene alkyl ether and water are well-mixed by ultrasonic waves. A surfactant dispersion liquid is made in this way. The toner is added in the surfactant dispersion liquid, and the resultant is stirred and is given ultrasonic waves energy. The resulting dispersion liquid is placed in a centrifuge tube, followed by subjecting the dispersion liquid to centrifugal separation. A supernatant in the centrifuge tube is removed and a sediment is filtrated. The filtrated sediment is washed and dried. BET specific surface area of the dried sediment is measured.

In accordance with some embodiments of the present invention, the toner preferably contains at most 12% of residual solid components by the Soxhlet extraction method using ethyl acetate as an extraction solvent.

The residual solid components by the Soxhlet extraction is measured as follows.

The toner and the cylindrical filter are weighed.

The toner is charged into a cylindrical filter.

The cylindrical filter is attached in middle part of Soxhlet extractor.

Ethyl acetate is poured in a flask arranged to the lowermost part of Soxhlet extractor.

A condenser is attached to the top part of Soxhlet extractor.

The flask is heated by such as mantle heater.

Ethyl acetate soluble components of the toner are extracted.

The cylindrical filter is taken out from Soxhlet extractor.

The cylindrical filter is dried.

Then, the cylindrical filter containing the residual solid components is weighed.

Accordingly, the content of the residual solid components can be determined.

When the content of the residual solid components by the Soxhlet extraction method using ethyl acetate as an extraction solvent exceeds 12%, the transfer property may be sufficient. The conventional polymerization toner has high molecular weight polymer, so the content of the residual solid components by the Soxhlet extraction method may exceed 12%. It is thought that the high molecular weight polymer cause a deterioration of fixability and the decrease of the gloss of a fixed image.

The volume average particle diameter (Dv), number average particle diameter (Dn), and circularity of the toner are measured by a flow particle image analyzer. In the present disclosure, the measurement is performed by a flow particle image analyzer FPIA-3000 from Sysmex Corporation under the above-described analysis conditions. The FPIA-3000 measures and analyzes particle images by means of imaging flow cytometry. A dispersion liquid of a sample is passed through a flow path (extending in a direction of flow) in a flat transparent flow cell (having a thickness of about 200 μm). A stroboscopic illumination and a CCD camera are each located on opposite sides of the flow cell so that an optical path is formed crossing the thickness direction of the flow cell. While the dispersion liquid is flowing, the stroboscopic illumination emits light at an interval of 1/60 seconds to obtain a two-dimensional image of the particles flowing in the flow cell. The two-dimensional image is at least partially parallel to the flow cell. Equivalent circle diameter (Dv, Dn) of each particle is determined from the diameter of a circle having the same area as the two-dimensional image of the particle.

Circularity of each particle is determined from the ratio of the perimeter (L) of a circle having the same area as the two-dimensional image of the particle to the perimeter (l) of the two-dimensional image of the particle. As the circularity (i.e., the ratio L/l) approaches one, the particle shape gets close to a true sphere.

The toner according to an embodiment of the present invention has an average circularity of from 0.965 to less than 0.985. And the toner preferably has BET specific surface area of at most 2.50 $m^2/g$. When BET specific surface area of the toner is within this range, it is possible for the toner particles to improve transfer efficiency from the latent image bearer to the transfer medium. So the quality of the image can be improved.

The particle size distribution Dv/Dn (i.e., the ratio of the volume average particle diameter to the number average particle diameter) of the toner is preferably from 1.00 to less than 1.15. When the particle size distribution is within this range, it is possible for the toner particles to improve transfer efficiency.

The toner according to an embodiment of the present invention preferably has a number average model particle diameter of from 3.0 μm to 7.0 μm. The number average model particle diameter can be measured by a method similar to a measurement method of the volume average particle diameter or the number average particle diameter.

The toner according to an embodiment of the present invention preferably has Si mass % concentration of at most 2.0 mass % measured by fluorescent X ray analysis. Detected Si derive from for example the external additive. When Si mass % concentration of the toner is at most 2.0 mass %, the occurrence of the filming is suppressed. The method for measuring fluorescent X ray is not particularly limited. Any known manner can be used as the method for measuring fluorescent X ray.

Method and Apparatus for Manufacturing Toner

A method of manufacturing the toner according to some embodiments of the present invention includes at least a liquid droplet formation process and a liquid droplet solidification process, and optionally other processes, if necessary. An apparatus for manufacturing the toner according to some embodiments of the present invention includes at least a liquid droplet formation device and a liquid droplet solidification device, and optionally other devices, if necessary. The method of manufacturing the toner is preferably performed by the apparatus for manufacturing the toner. The liquid droplet formation process is preferably performed by the liquid droplet formation device. The liquid droplet solidification process is preferably performed by the liquid droplet solidification device. The other processes are preferably performed by the other devices.

Liquid Droplet Formation Process and Liquid Droplet Formation Device

The liquid droplet formation process is a process of discharging a toner composition liquid in which the binder resin, the colorant and the release agent are dissolved or dispersed to form it into liquid droplets. The liquid droplet formation device is a device for discharging a toner composition liquid in which the binder resin, the colorant and the release agent are dissolved or dispersed to form it into liquid droplets.

The toner composition liquid is prepared by dissolving or dispersing toner compositions in an organic solvent. The toner compositions include at least the binder resin, the colorant and the release agent, and optionally other components, if necessary.

Organic Solvent

The organic solvent is volatile and capable of dissolving or dispersing the toner compositions without causing a phase separation of the binder resin from the release agent.

Liquid Droplet Discharge Device

The liquid droplet discharge device is not limited in configuration so long as the discharged liquid droplets have a narrow particle diameter distribution. The liquid droplet discharge device is of several types: a single-fluid nozzle, a two-fluid nozzle, a film-vibration-type discharge device, a Rayleigh-fission-type discharge device, a liquid-vibration-type discharge device, and a liquid-column-resonance-type discharge device. For example, a film-vibration-type discharge device is described in JP-2008-292976-A, a Rayleigh-fission-type discharge device is described in JP-4647506-B2 (corresponding to JP-2007-199463-A), and a liquid-vibration-type discharge device is described in JP-2010-102195-A, the disclosure of each of which incorporated herein by reference.

To narrow the particle diameter distribution of the liquid droplets and secure the productivity of the toner, the liquid-column-resonance-type discharge device is preferably used. In the liquid-column-resonance-type discharge device, a vibration is applied from a vibrator to the toner composition liquid contained in a liquid column resonance liquid chamber having multiple discharge holes to form a liquid column resonant standing wave therein, and the toner composition liquid is periodically discharged from the multiple discharge holes formed within an area corresponding to antinodes of the liquid column resonant standing wave.

Liquid Column Resonance Liquid Droplet Discharge Device

One example of the liquid-column-resonance-type liquid droplet discharge device is described in detail below. FIG. 1 is a cross-sectional view of a liquid column resonance liquid droplet forming device in accordance with some embodiments of the present invention. The liquid column resonance liquid droplet discharge device 11 has a liquid common supply path 17 and a liquid column resonance liquid chamber 18. The liquid column resonance liquid chamber 18 is communicated with the liquid common supply path 17 disposed on its one end wall surface in a longitudinal direction. The liquid column resonance liquid chamber 18 has discharge holes 19 to discharge liquid droplets 21, on its one wall surface which is connected with its both longitudinal end wall surfaces. The liquid column resonance liquid chamber 18 also has a vibration generator 20 to generate high-frequency vibration for forming a liquid column resonant standing wave, on the wall surface facing the discharge holes 19. The vibration generator 20 is connected to a high-frequency power source.

The liquid to be supplied to the liquid column resonance liquid chamber 18 may be, for example, a fine particle-constituents-containing liquid in which the fine particle constituents are dissolved or dispersed. Since the liquid just has to be in a liquid state and does not necessarily include any solvent, the liquid may take a form of a fine particle-constituents-melting liquid comprised of the fine particle constituents in a melted state.

A toner composition liquid 14 is flowed into the liquid common supply path 17 disposed within a liquid droplet formation unit, as illustrated in FIG. 2, through a liquid supply tube by a liquid circulating pump and is supplied to each liquid column resonance liquid chamber 18 disposed within the liquid column resonance liquid droplet discharge device 11, as illustrated in FIG. 1 Within the liquid column resonance liquid chamber 18 filled with the toner composition liquid 14, the vibration generator 20 causes liquid column resonance and generates a pressure standing wave. Thus, a pressure distribution is formed therein.

The liquid droplets 21 are discharged from the discharge holes 19 provided within an area corresponding to an antinode of the pressure standing wave, where the amplitude in pressure variation is large. The area corresponding to an antinode is defined as an area not corresponding to a node of the pressure standing wave. Preferably, the area corresponding to an antinode is an area where the amplitude in pressure variation of the standing wave is large enough to discharge liquid droplets. More preferably, the area corresponding to an antinode is an area extending from a position at a local maximum amplitude (i.e., a node of the velocity standing wave) toward a position at a local minimum amplitude for a distance ±¼ of the wavelength of the pressure standing wave. Within the area corresponding to an antinode of the pressure standing wave, even in a case in which multiple discharge holes are provided, each of the multiple discharge holes discharges uniform liquid droplets at a high degree of efficiency without causing clogging.

After passing the liquid common supply path 17, the toner composition liquid 14 flows into a liquid return pipe and returns to a raw material container. As the liquid droplets 21 are discharged, the amount of the toner composition liquid 14 in the liquid column resonance liquid chamber 18 is reduced and a suction force generated by the action of the liquid column resonance standing wave is also reduced within the liquid column resonance liquid chamber 18. Thus, the liquid common supply path 17 temporarily increases the flow rate of the toner composition liquid 14 to fill the liquid column resonance liquid chamber 18 with the toner composition liquid 14. After the liquid column resonance liquid chamber 18 is refilled with the toner composition liquid 14, the flow rate of the toner composition liquid 14 in the liquid common supply path 17 is returned.

The liquid column resonance liquid chamber 18 may be formed of joined frames formed of a material having a high stiffness which does not adversely affect liquid resonant frequency of the liquid at drive frequency, such as metals, ceramics, and silicone. A length L between both longitudinal ends of the liquid column resonance liquid chamber 18 illustrated in FIG. 1 is determined based on a mechanism of liquid column resonance to be described in detail later.

A width W of the liquid column resonance liquid chamber 18 illustrated in FIG. 2 may be smaller than a half of the length L of the liquid column resonance liquid chamber 18 so as not to give excessive frequency to the liquid column resonance. Preferably, a single liquid droplet formation unit includes multiple liquid column resonance liquid chambers 18 to drastically improve productivity. The number of the liquid column resonance liquid chambers 18 in one liquid droplet formation unit is not limited to any particular number, but when the number is from 100 to 2,000, operability and productivity go together, which is preferable. Each of the liquid column resonance liquid chambers 18 is communicated with the liquid common supply path 17 through each liquid supply path. The liquid common supply path 17 is communicated with multiple liquid column resonance liquid chambers 18.

The vibration generator 20 is not limited to any particular device so long as it can be driven at a predetermined frequency. For example, the vibration generator 20 may be formed from a piezoelectric body and an elastic plate 9 attached to each other. The elastic plate 9 constitutes a part of the wall of the liquid column resonance liquid chamber 18 so that the piezoelectric body does not contact the liquid. The piezoelectric body may be, for example, a piezoelectric ceramic such as lead zirconate titanate (PZT), which is generally laminated because of having a small displacement. Additionally, piezoelectric polymers such as polyvinylidene fluoride (PVDF), crystals, and single crystals of LiNbO3, LiTaO3, and KNbO3 are also usable.

Preferably, the vibration generator 20 in each liquid column resonance liquid chamber is independently controllable. Alternatively, a single blockish vibrating material may be partially cut to fit the arrangement of the liquid column resonance liquid chambers so that each liquid column resonance liquid chamber is independently controllable through the elastic plate.

Each of the discharge holes 19 preferably has an outlet diameter of from 1 µm to 40 µm. When the outlet diameter is less than 1 µm, the resulting liquid droplets may be too small to be used as a toner. In a case in which the liquid includes solid fine particles, such as pigments, the discharge holes 19 will be clogged frequently and the productivity will decrease. When the outlet diameter exceeds 40 µm, the diameter of each liquid droplets may be too large. In case such large liquid droplets are dried and solidified into toner particles having a desired particle diameter of from 3 µm to 6 µm, the toner composition needs to be diluted with an organic solvent. Moreover, a large amount of drying energy is needed to obtain a certain amount of toner, which is not preferable.

Arranging the discharge holes 19 in the width direction of the liquid column resonance liquid chamber 18, as illustrated in FIG. 2, is preferable because it is possible to arrange a large number of the discharge holes 19 and to improve production efficiency. The liquid column resonant frequency varies depending on the arrangement of the discharge holes 19. Thus, the liquid column resonant frequency may be varied in accordance with the nozzle arrangement and corresponding liquid droplets discharge condition. The cross-sectional shape of each of the discharge holes 19 has a tapered shape such that the outlet diameter gets smaller, as illustrated in FIG. 1, but is not limited thereto.

FIGS. 3A to 3D are schematic cross-sectional views of the discharge holes of the liquid column resonance liquid chamber in accordance with some embodiments of the present invention. Examples of the cross-section of the discharge holes 19 are illustrated in FIGS. 3A to 3D. The discharge holes illustrated in FIG. 3A have a cross-section such that a thin film 41 forming the discharge holes 19 has a round surface from an upper surface thereof contacted with the liquid 14 toward the bottom surface thereof forming the discharge holes 19 in such a manner that the gap between one thin film and the adjacent thin film narrows toward the exit. When the thin film 41 is vibrated, the pressure applied to the liquid at the exit of the discharge holes 19 is maximized. Therefore, the shape of the discharge holes illustrated in FIG. 3A is most preferable to stably discharge liquid droplets. The discharge holes illustrated in FIG. 3B have a cross-section such that the thin film 41 forming the discharge holes 19 is tapered from an upper surface thereof contacted with the liquid toward the bottom surface thereof forming the discharge holes 19 in such a manner that the gap between one thin film and the adjacent thin film narrows toward the exit at a constant rate (namely the surface of the thin film 41 is slanted at a constant angle (i.e., nozzle angle 24)). The nozzle angle 24 can be set to a proper angle. Similarly to the discharge holes illustrated in FIG. 3A, when the thin film 41 is vibrated, the pressure applied to the liquid at the exit of discharge holes 19 can be increased due to this nozzle angle 24. The nozzle angle 24 is preferably from 60° to less than 90°. When the nozzle angle 24 is less than 60°, a sufficient pressure can be applied to the liquid, and in addition the thin film 41 has good processability (i.e., the thin film 41 can be easily prepared). When the nozzle angle 24 is 90°, the discharge holes are the same as the discharge holes illustrated in FIG. 3C. In the discharge holes illustrated in FIG. 3C, it becomes hard to apply a pressure to the exit of the discharge holes 19. Therefore, the maximum of the nozzle angle 24 is 90°. When the nozzle angle 24 exceeds 90°, it is hard to apply a pressure to the exit of the discharge holes 19, thereby seriously destabilizing discharge of liquid droplets. The discharge holes illustrated in FIG. 3D have a cross-section having a combined shape of the shape illustrated in FIG. 3A and the shape illustrated in FIG. 3C. It is possible that the shape of the discharge holes 19 is stepwise changed like the discharge holes illustrated in FIG. 3D.

A Mechanism of Liquid Droplet Formation

A mechanism of liquid droplet formation in the liquid droplet formation unit is described in detail below. First, a mechanism of liquid column resonance generated in the liquid column resonance liquid chamber 18 in the liquid column resonance liquid droplet discharge device 11 is described. The resonant wavelength $\lambda$ is represented by the following formula (1):

$\lambda = c/f$ (1) wherein c represents a sonic speed in the toner composition liquid in the liquid column resonance liquid chamber 18 and f represents a drive frequency given to the toner composition liquid from the vibration generator 20.

Referring to FIG. 1, L represents a length between the fixed end of the frame of the liquid column resonance liquid chamber 18 and the other end thereof closer to the liquid common supply path 17;

h1 (e.g., about 80 μm) represents a height of the end of the frame of the liquid column resonance liquid chamber 18 closer to the liquid common supply path 17;

and h2 (e.g., about 40 μm) represents a height of a communication opening between the liquid column resonance liquid chamber 18 and the liquid common supply path 17.

The height h1 is preferably about twice as much as the height h2. The end closer to the liquid common supply path 17 is equivalent to a fixed end. When both ends are fixed, resonance most effectively occurs when the length L is an even multiple of $\lambda/4$.

In this case, the length L is represented by the following formula (2):

$$L = (N/4)\lambda \quad (2)$$

wherein N represents an even number.

The formula (2) is also satisfied when both ends of the liquid column resonance liquid chamber 18 are completely open or free. Similarly, when one end is open or free so that pressure can be released and the other end is closed or fixed, resonance most effectively occurs when the length L is an odd multiple of $\lambda/4$. In this case, the length L is represented by the formula (2) as well, wherein N represents an odd number.

Thus, the most effective drive frequency f is derived from the formulae (1) and (2) and represented by the following formula (3):

$$f = N \times c/(4L) \quad (3)$$

Actually, vibration is not infinitely amplified because the liquid attenuates resonance due to its viscosity. Therefore, resonance can occur even at a frequency around the most effective drive frequency f represented by the formula (3), as shown in the later-described formula (4) or (5).

Figure 4A:
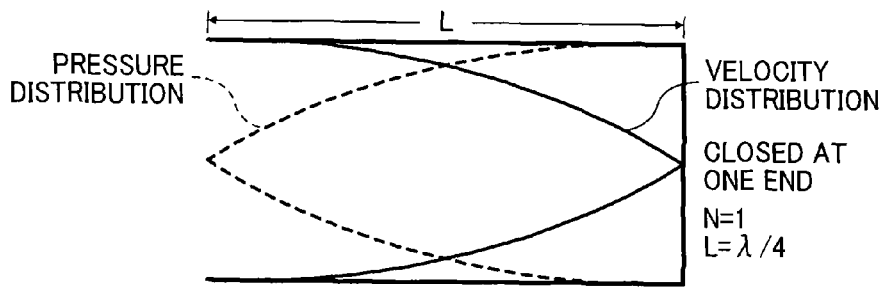
FIGS. 4A to 4D are schematic views of wave configurations of velocity and pressure standing waves when N is 1, 2, or 3.
Figure 4B:
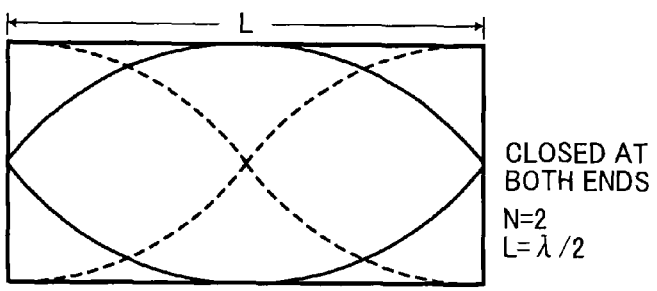
Figure 4C:
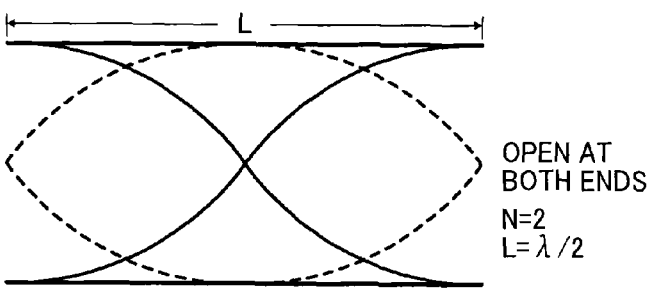
Figure 4D:
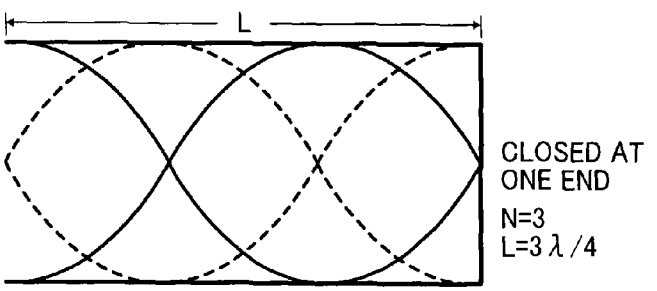
Figure 5A:
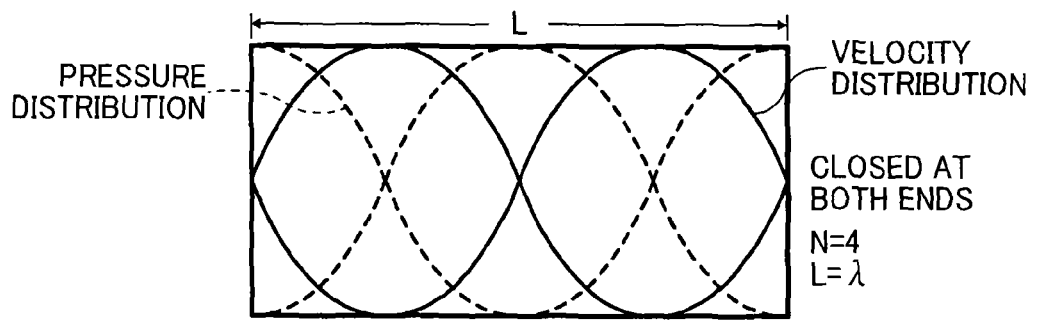
FIGS. 5A to 5C are schematic views of wave configurations of velocity and pressure standing waves when N is 4 or 5.
Figure 5B:
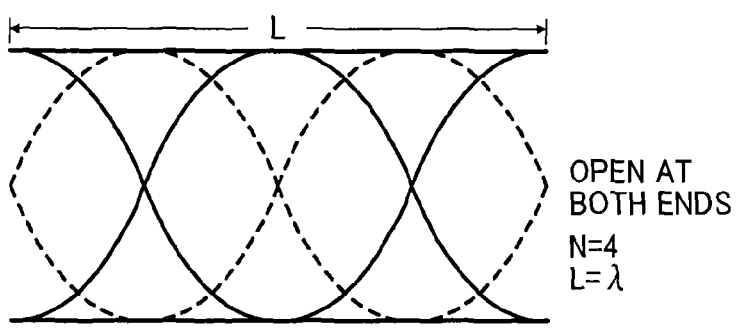
Figure 5C:
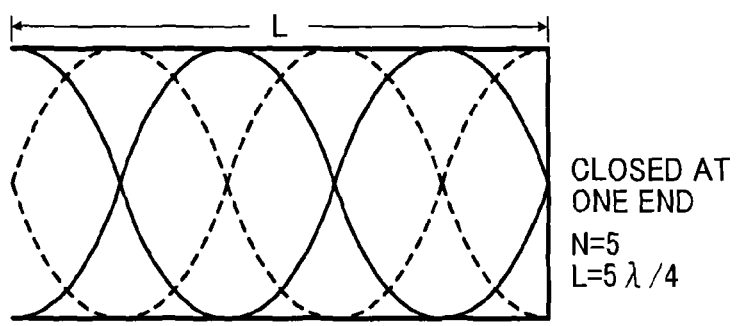

FIGS. 4A to 4D are views of wave configurations (i.e., resonant modes) of velocity and pressure standing waves when N is 1, 2, or 3. FIGS. 5A to 5C are views of wave configurations (i.e., resonant modes) of velocity and pressure standing waves when N is 4 or 5. The standing waves are longitudinal waves in actual but are generally illustrated as transversal waves as in FIGS. 4A to 4D and FIGS. 5A to 5C. In FIGS. 4A to 4D and FIGS. 5A to 5C, solid lines represent velocity standing waves and dotted lines represent pressure standing waves. For example, referring to FIG. 4A, it is intuitively understandable that when one end is closed and N is 1, amplitude of the velocity standing wave is zero at the closed end and is maximum at the open end.

When L represents the length between both longitudinal ends of the liquid column resonance liquid chamber 18 and $\lambda$ represents the liquid column resonant wavelength of the liquid, standing waves most effectively occur when the integer N is from 1 to 5. Wave configurations of the standing waves depend on whether or not either end is open or closed. The condition of either end depends on conditions of discharge holes and/or supply openings.

In acoustics, an open end is defined as a point at which longitudinal velocity of a medium (e.g., a liquid) is maximum and pressure thereof is zero. A closed end is defined as a point at which longitudinal velocity of the medium is zero. The closed end is acoustically considered as a hard wall that reflects waves. When each end is ideally completely closed or open, resonant standing waves as illustrated in FIGS. 4A to 4D and FIGS. 5A to 5C occur. Configurations of the standing waves vary depending on the number and/or arrangement of the discharge holes. Thus, resonant frequency can appear even at a position displaced from the position derived from the formula (3). Even in such cases, stable discharge conditions can be provided by adjusting the drive frequency.

For example, when the sonic speed c in the liquid is 1,200 m/s, the length L between both ends of the liquid column resonance liquid chamber 18 is 1.85 mm, both ends are fixed with wall surfaces, i.e., both ends are closed, and N is 2, the most effective resonant frequency is derived from the formula (3) as 324 kHz. As another example, when the sonic speed c in the liquid is 1,200 m/s, the length L between both ends of the liquid column resonance liquid chamber 18 is 1.85 mm, both ends are fixed with wall surfaces, i.e., both ends are closed, and N is 4, the most effective resonant frequency is derived from the formula (3) as 648 kHz. Thus, higher resonance can occur in the single liquid column resonance liquid chamber 18.

In the liquid column resonance liquid chamber 18 of the liquid column resonance liquid droplet discharge device 11 illustrated in FIG. 1, preferably, both ends are equivalent to closed ends or are regarded as being acoustically soft walls due to the influence of the discharge hole openings, to increase the frequency. Of course, both ends may be equivalent to open ends. The influence of the discharge hole openings means a lesser acoustic impedance and a greater compliance component. When the liquid column resonance liquid chamber 18 has wall surfaces on both longitudinal ends, as illustrated in FIG. 4B or FIG. 5A, all possible resonant modes are available as if both ends are closed or one end is open, which is preferable.

In particular, the drive frequency depends on the number, arrangement, and/or cross-sectional shape of the discharge holes 19. For example, as the number of the discharge holes 19 increases, closed ends of the liquid column resonance liquid chamber 18 are gradually released from restriction. As a result, a resonant standing wave is generated as if both ends are substantially open and the drive frequency is increased. The restriction releases from the position of one of the discharge holes 19 disposed closest to a liquid supply path 17. As another example, when each of the discharge holes 19 has a round cross-sectional shape or the volume of each discharge hole 19 is varied by varying the frame thickness, the actual standing wave has a short wavelength which has a higher frequency than the drive frequency.

Upon application of voltage to the vibration generator 20 with the drive frequency thus determined, the vibration generator 20 deforms so as to generate a resonant standing wave most effectively. A liquid column resonance standing wave can generate even at a frequency around the most effective drive frequency for generating a resonant standing wave. When the vibration generator 20 vibrates at a drive frequency f satisfying the following formulae (4) and (5), a liquid column resonance is generated and liquid droplets are discharged from the discharge holes 19: wherein L represents a length between both longitudinal ends of the liquid column resonance liquid chamber 18 and Le represents a distance between a longitudinal end of the liquid column resonance liquid chamber 18 closer to the liquid common supply path 17 and the discharge hole 19 closest to the longitudinal end.

$$N \times c/(4L) \leq f \times N \times c/(4Le) \quad (4)$$

$$N \times c/(4L) \leq f \leq (N+1) \times c/(4Le) \quad (5)$$

It is preferable that an inequation Le/L>0.6 is satisfied.

Based on the above-described mechanism of liquid column resonance, a liquid column resonant pressure standing wave is formed in the liquid column resonance liquid chamber 18 illustrated in FIG. 1 and liquid droplets are continuously discharged from the discharge holes 19 disposed to a part of the liquid column resonance liquid chamber 18. When the discharge holes 19 are disposed at a position of the maximum amplitude of the pressure standing wave, discharge efficiency becomes maximum and low-voltage driving is allowed, which is preferable.

The liquid column resonance liquid chamber 18 has at least one discharge hole 19, but preferably multiple discharge holes 19 to improve productivity. Preferably, the number of the discharge holes 19 per liquid column resonance liquid chamber 18 is from 2 to 100. When the number of discharge holes exceed 100, the voltage applied to the vibration generator 20 has to be increased in order to form liquid droplets having a desired particle diameter. In this case, the piezoelectric body serving as the vibration generator tends to operate unsteady.

Preferably, the interval between adjacent discharge holes 19 is at least 20 μm, and is equal to or less than the length of the liquid column resonance liquid chamber 18. When the distance between two adjacent discharge holes is less than 20 μm, the chance of collision of liquid droplets discharged from the two adjacent discharge holes is increased, thereby forming large particles, resulting in deterioration of the particle diameter distribution of the resultant toner.

Details of a liquid column resonance phenomenon occurring in the liquid column resonance liquid chamber 18 are described with reference to FIGS. 6A to 6D. In FIGS. 6A to 6D, solid lines represent velocity distributions at arbitrary points in a longitudinal direction within the liquid column resonance liquid chamber 18. With respect to the velocity, the direction from the closed-end wall side (i.e., left side) toward the open-end wall side (i.e., right side) is defined as the plus (+) direction and the opposite direction is defined as the minus (−) direction. Dotted lines represent pressure distributions at arbitrary points in a longitudinal direction within the liquid column resonance liquid chamber 18. Positive and negative pressures relative to atmospheric pressure are respectively indicated as the plus (+) and minus (−) pressures in FIGS. 6A to 6D. Specifically, when the pressure in the liquid column resonance liquid chamber 18 is a positive pressure, a downward pressure is applied to the toner component liquid 14 in FIGS. 6A to 6D. In contrast, when the pressure is a negative pressure, an upward pressure is applied to the toner component liquid in FIGS. 6A to 6D.

In this regard, although the end of the liquid column resonance liquid chamber 18 closer to the liquid common supply path 17 is opened as mentioned above, the height (h1 in FIG. 1) of the end of the frame (fixed end) of the liquid column resonance liquid chamber 18 is preferably not less than about twice the height (h2 in FIG. 1) of a communication opening between the liquid column resonance liquid chamber 18 and the liquid common supply path 17, and therefore temporal changes of the velocity distribution curve and the pressure distribution curve are illustrated in FIGS. 6A-6D while assuming that the liquid column resonance liquid chamber 18 has two fixed ends.

Figure 6A:
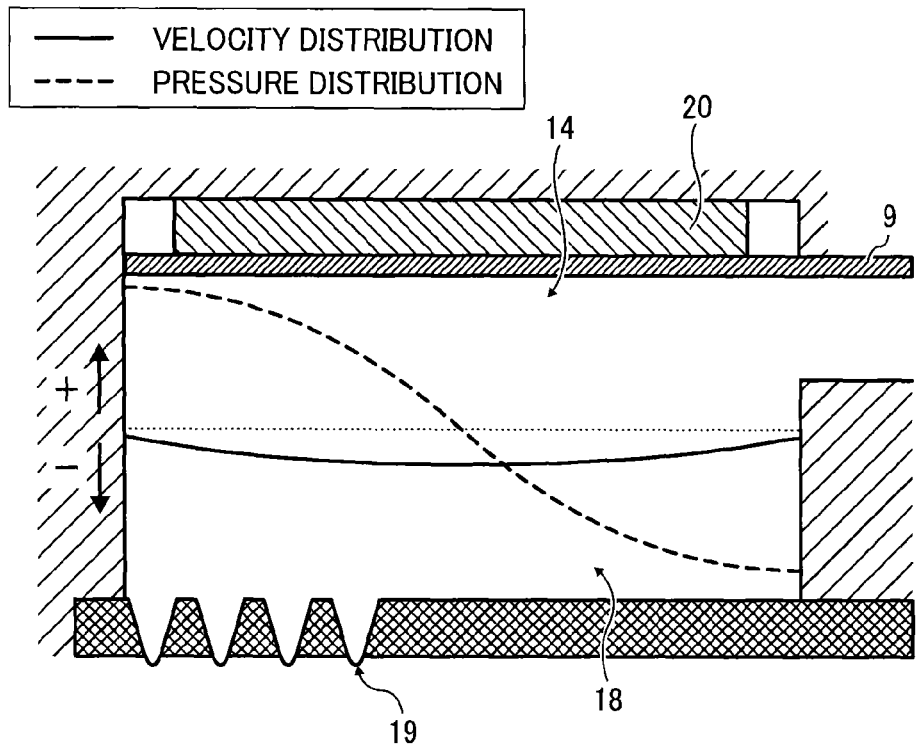
FIGS. 6A to 6D are schematic views illustrating a liquid column resonance phenomenon occurring in the liquid column resonance liquid droplet forming device.
Figure 6B:
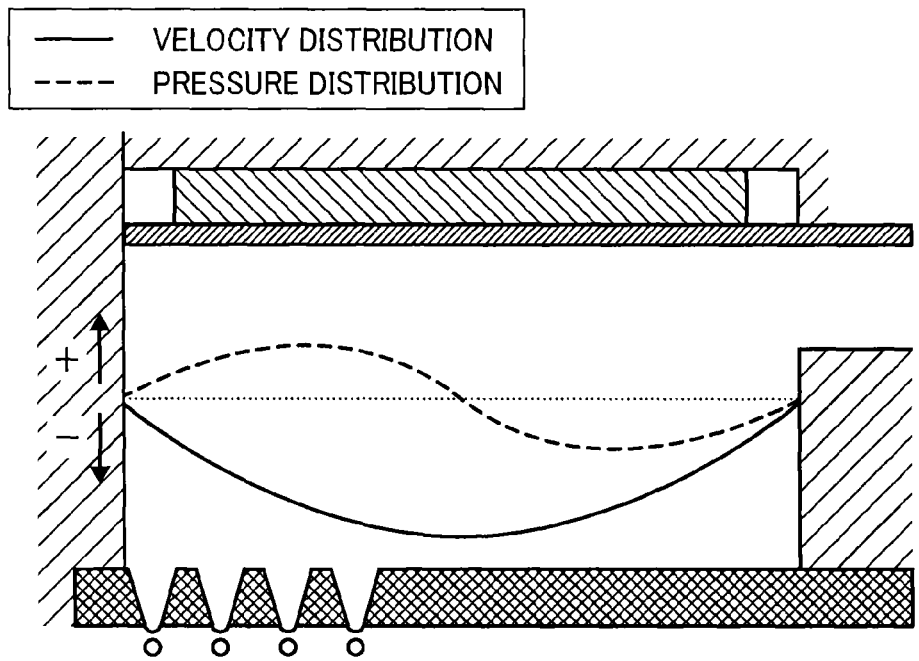

FIG. 6A illustrates the pressure waveform and the velocity waveform in the liquid column resonance liquid chamber 18 just when liquid droplets are discharged from the discharge holes 19. As illustrated in FIG. 6A, the pressure in a portion of the toner component liquid above the discharge holes 19 in the liquid column resonance liquid chamber 18 is maximized, and thereby the toner component liquid is excluded from the discharge holes 19 as liquid columns. Next, as illustrated in FIG. 6B, the positive pressure in the vicinity of the discharge holes 19 is decreased so as to approach the negative region (pressure), and thereby the liquid columns of the toner component liquid are cut, resulting in discharge of the liquid droplets 21.

Figure 6C:
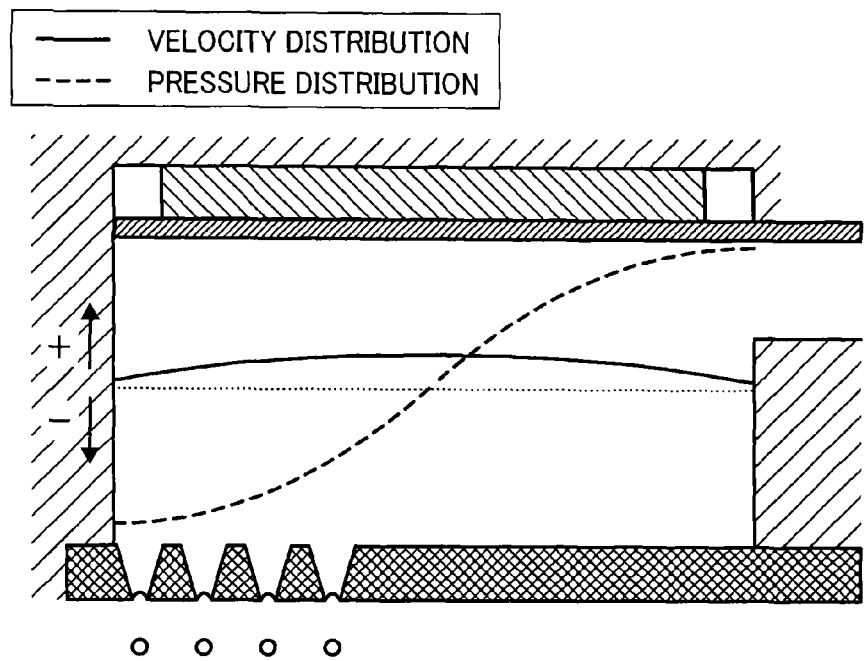
Figure 6D:
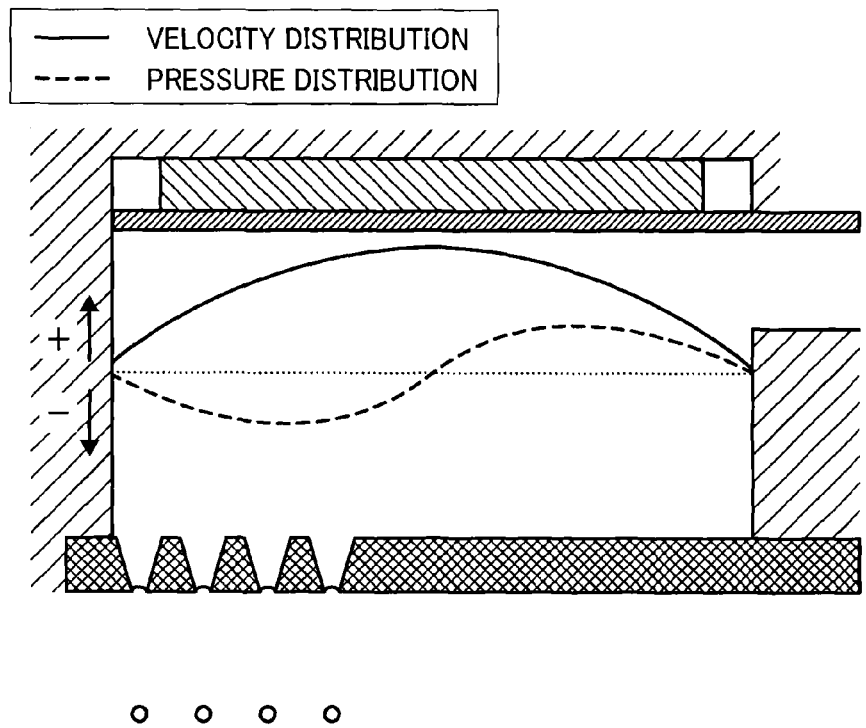

After liquid droplets are discharged, the pressure in the vicinity of the discharge holes 19 is minimized (i.e., maximized in the negative region) as illustrated in FIG. 6C. In this case, feeding the toner composition liquid 14 to the liquid column resonance liquid chamber 18 from the liquid common supply path 17 is started. Next, as illustrated in FIG. 6D, the negative pressure in the vicinity of the discharge holes 19 is decreased, and the pressure is changed toward a positive pressure. Thus, filling the toner composition liquid 14 is completed.

Next, the positive pressure in the droplet discharge area of the liquid column resonance liquid chamber 18 is maximized as illustrated in FIG. 6A, and then the liquid droplets 21 of the toner component liquid 14 are discharged from the discharge holes 19. Thus, the liquid droplets 21 are continuously discharged from the discharge holes 19.

Figure 9:
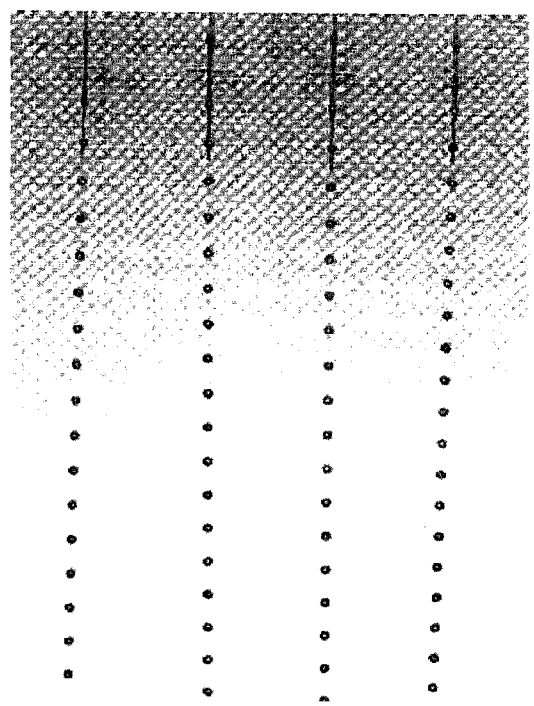
FIG. 9 is a photograph of liquid droplets discharged from the liquid column resonance liquid droplet forming device, which is taken by a laser shadowgraphy method.

An experiment on this liquid droplet discharge operation is performed. Specifically, the length (L) of the liquid column resonance liquid chamber 18 is 1.85 mm, and N is 2. In addition, the discharge holes 19 have four holes (i.e., first to fourth holes) at a location corresponding to the antinode of the pressure standing wave in the N=2 mode. Further, a sine wave having a frequency of 340 kHz is used to discharge liquid droplets of a toner composition liquid. FIG. 9 is a photograph, which is taken by using a laser shadowgraphy method and which shows liquid droplets of the toner composition liquid discharged from the four holes. It can be understood from FIG. 9 that liquid droplets having substantially the same particle diameter can be discharged from the four holes at substantially the same velocity.

Figure 10:
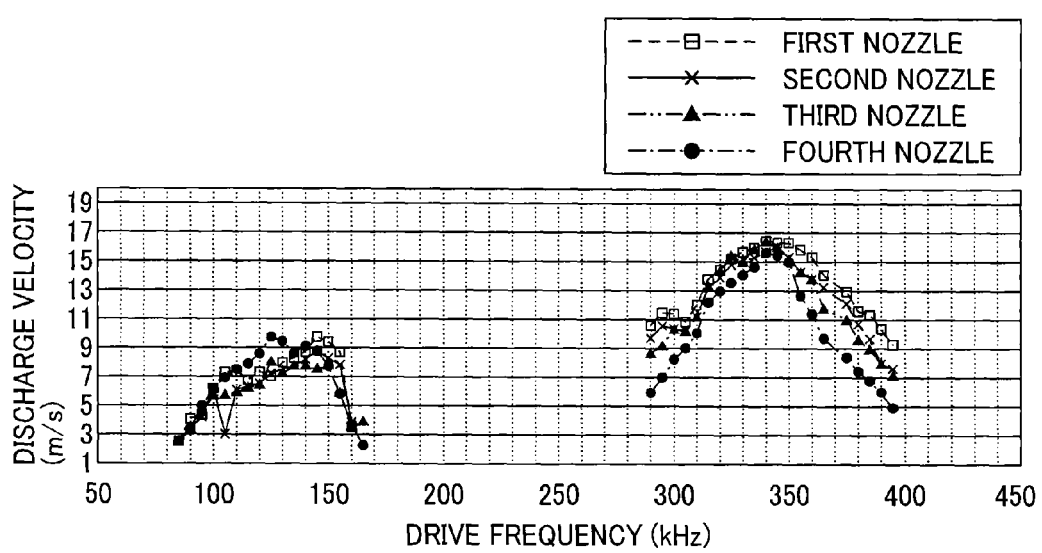
FIG. 10 is a graph showing the relation between the drive frequency of vibration and the velocity of discharged liquid droplet.

FIG. 10 is a graph showing the velocity of liquid droplets discharged from the first to fourth holes at a location corresponding to the antinode of the pressure standing wave in the N=1 mode when using a sine wave with a drive frequency in a range of from 85 kHz to 165 kHz, and the graph showing the velocity of liquid droplets discharged from the first to fourth holes at a location corresponding to the antinode of the pressure standing wave in the N=2 mode when using a sine wave with a drive frequency in a range of from 290 kHz to 395 kHz. FIG. 10 shows a drive frequency (kHz) in a horizontal axis, and a discharge velocity (m/s) in a vertical axis.

It can be understood from FIG. 10 that at the frequency of 340 kHz, the velocities of liquid droplets discharged from the first to fourth discharge holes are substantially the same while the velocities are maximized. Namely, it could be confirmed that liquid droplets of the toner composition liquid are evenly discharged from the antinode of the liquid column resonance standing wave when the N=2 mode is used (i.e., when the liquid column resonance frequency is 340 kHz). In addition, the velocities of liquid droplets discharged from the first to fourth discharge holes when the N=1 first mode is used (i.e., when the liquid column resonance frequency is 130 kHz) are shown on the left side of the graph (FIG. 10). It can also be understood from FIG. 10 that liquid droplets are not discharged between the N=1 mode (130 kHz) and the N=2 mode (340 kHz). This frequency characteristic is specific to liquid column resonance standing waves, and therefore it is confirmed that liquid column resonance occurs in the chamber 18.

Liquid Droplet Solidification Process and Liquid Droplet Solidification Device

The liquid droplet solidification process is a process of solidifying the liquid droplets to form a toner. This process includes a solidification treatment in which the liquid droplets of the toner composition liquid discharged from the liquid droplet discharge device into a gas phase are solidified and a collection treatment in which the solidified particles are collected. The liquid droplet solidification device is a device for solidifying the liquid droplets to form a toner.

The solidification treatment is not limited to any particular procedure so long as the toner composition liquid can be solidified, and is selected in accordance with the property of the toner composition liquid. For example, when the toner composition liquid is comprised of a volatile solvent in which raw materials are dissolved or dispersed, the discharged liquid droplets can be solidified by drying the liquid droplets in a carrier gas flow, in other words, evaporating the solvent. The drying condition is controllable by controlling the temperature of the injection gas, vapor pressure, and kind of the gas. The liquid droplets need not necessarily be completely dried so long as the collected particles are kept in a solid state. In this case, the collected particles may be subject to an additional drying process. Alternatively, the solidification treatment may involve thermal change or a chemical reaction.

In the collection treatment, the solidified particles can be collected by any powder collector, such as a cyclone collector or a back filter.

Figure 7:
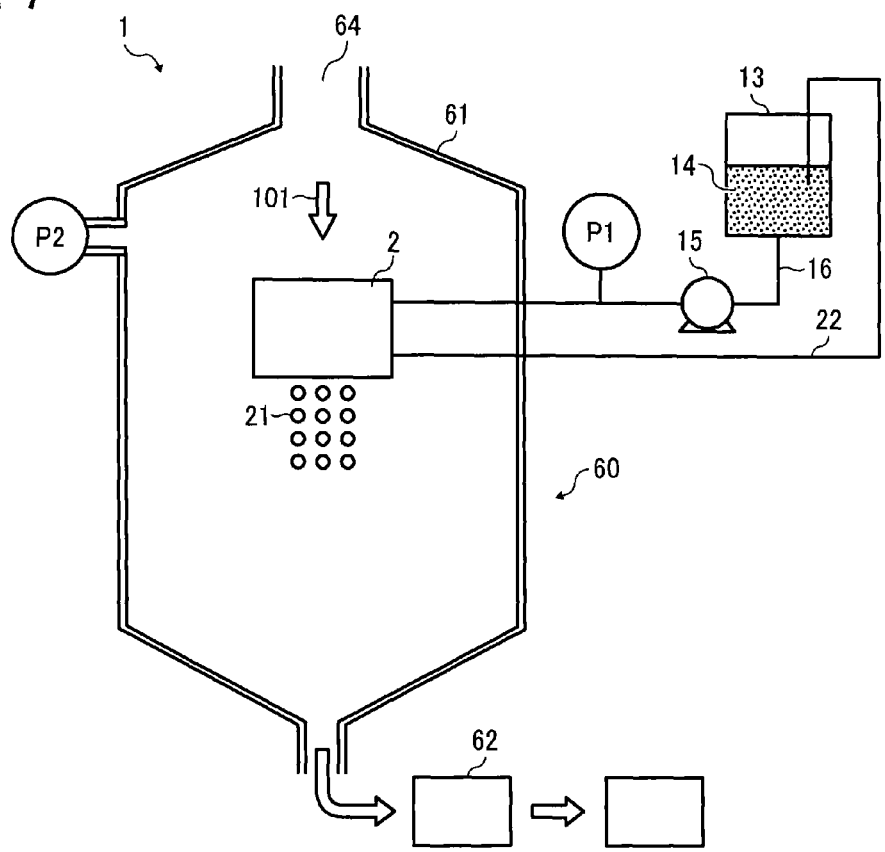
FIG. 7 is a cross-sectional view of an apparatus for manufacturing the toner according to an embodiment of the present invention.

One example of an apparatus for manufacturing the toner according to some embodiments of the present invention is described in detail below with reference to FIG. 7.

A toner manufacturing apparatus 1 has a liquid droplet discharge device 2 and a drying collecting unit 60. The liquid droplet discharge device 2 is connected to a raw material container 13 containing the toner composition liquid 14 through a liquid supply pipe 16 to supply the toner composition liquid 14 from the raw material container 13 to the liquid droplet discharge device 2. The liquid droplet discharge device 2 is further connected to a liquid return pipe 22 to return the toner composition liquid 14 to the raw material container 13, and a liquid circulating pump 15 to pump the toner composition liquid 14 within the liquid supply pipe 16. Thus, the toner composition liquid 14 can be constantly supplied to the liquid droplet discharge device 2.

The liquid supply pipe 16 and the drying collecting unit 60 are equipped with pressure gauges P1 and P2, respectively. The pressure gauges P1 and P2 monitor the liquid feed pressure toward the liquid droplet discharge device 2 and the inner pressure of the drying collecting unit 60, respectively. When the pressure measured by the pressure gauge P1 is greater than that measured by the pressure gauge P2 (i.e., P1>P2), there is a concern that the toner composition liquid 14 leaks from the discharge holes. When the pressure measured by the pressure gauge P1 is smaller than that measured by the pressure gauge P2 (i.e., P1<P2), there is a concern that a gas flows in the liquid droplet discharge device 2 and the liquid droplet discharge phenomenon is stopped. Thus, preferably, the pressure measured by the pressure gauge P1 is nearly identical to that measured by the pressure gauge P2. Within a chamber 61, a conveyance airflow 101 is formed through a conveyance airflow inlet 64. Liquid droplets 21 discharged from the liquid droplet discharge device 2 are conveyed downward by the action of gravity as well as the conveyance airflow 101 and collected by a solidified particle collector 62.

Conveyance Airflow

If the injected liquid droplets are brought into contact with each other before being dried, the liquid droplets coalesce with each other to form a single particle. (This phenomenon is hereinafter referred to as "coalescence".) To obtain solidified particles having a uniform particle diameter distribution, it is preferable that the distance between the injected liquid droplets is kept constant. Although the initial velocity is constant, the injected liquid droplet is gradually stalled due to air resistance. As a result, a posterior liquid droplet may catch up on and coalesce with the stalled particle.

Because this phenomenon occurs constantly, the particle diameter distribution of the resulting collected particles may become undesirably wide. To prevent coalescence of liquid droplets, liquid droplets should be conveyed to the solidified particle collector 62 by the conveyance airflow 101 while being solidified without being stalled or brought into contact with each other.

Figure 8:
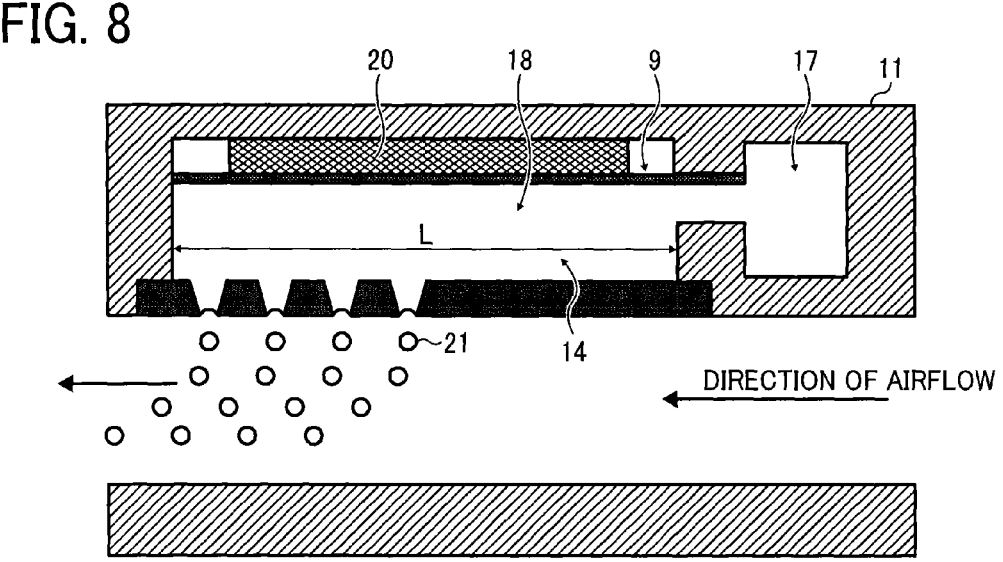
FIG. 8 is a cross-sectional view of a liquid column resonance liquid droplet forming device in accordance with some embodiments of the present invention.

Referring to FIG. 1, a part of the conveyance airflow 101 (hereinafter maybe referred to as "first airflow") can flow near the liquid droplet discharge device in the same direction as the direction of discharge of liquid droplets, so as to prevent speed decrease of the liquid droplets immediately after the discharge to prevent coalescence of the liquid droplets. Alternatively, the first airflow can flow in a direction lateral to the direction of discharge of liquid droplets, as illustrated in FIG. 8. Alternatively, the first airflow can flow at a certain angle with the liquid droplet discharge device such that the liquid droplets are brought away from the liquid droplet discharge device. In a case in which the first airflow (hereinafter maybe referred to as "coalescence preventing airflow") flows in a direction lateral to the direction of discharge of liquid droplets, as illustrated in FIG. 8, it is preferable that the first airflow convey liquid droplets in a manner such that the travel path of each liquid droplet starting from any discharge hole will not intercept that of another liquid droplet.

It is also possible that coalescence of the liquid droplets is prevented by the first airflow and the solidified particles are conveyed to the toner collector by the second airflow. It is preferable that the speed of the first airflow be equal to or more than the liquid droplet injection speed. If the speed of the first airflow is smaller than the liquid droplet injection speed, it is difficult for the first airflow (coalescence preventing airflow) to achieve its purpose, i.e., to prevent coalescence of the liquid droplets. The first airflow can have any additional property for preventing coalescence of the liquid droplets and does not necessarily have the same property as the second airflow. In the first airflow (coalescence preventing airflow), a chemical substance which accelerates solidification of the liquid droplets can be mixed. Additionally, the first airflow (coalescence preventing airflow) can be physically treated to have a function of accelerating solidification of the liquid droplets.

The conveyance airflow 101 is not limited in condition, and may be, for example, a laminar flow, a swirl flow, or a turbulent flow. The conveyance airflow 101 is not limited in substance, and may be formed of, for example, the air or a noncombustible gas such as nitrogen. The temperature of the conveyance airflow 101 is variable but is preferably constant during the manufacturing operation. The chamber 61 may further include a unit for varying the condition of the conveyance airflow 101. The conveyance airflow 101 may prevent not only the coalescence of the liquid droplets 21 but also the adhesion of the liquid droplets 21 to the chamber 61.

Other Processes

The method of manufacturing the toner according to some embodiments of the present invention may include a secondary drying process. When toner particles collected in the drying collecting unit 62 illustrated in FIG. 7 contain a large amount of residual solvent, the toner particles can be optionally subjected to a secondary drying to reduce the amount residual solvent. The secondary drying can be performed by any drier, such as a fluidized-bed drier or a vacuum drier. If residual solvent is remaining in the toner particles, toner properties such as heat-resistant storage stability, fixability, and chargeability may deteriorate with time. Moreover, when such toner particles are fixed on a recording material by application of heat, the solvent volatilizes with increasing a possibility of adversely affecting users and peripheral devices.

Developer

The developer according to some embodiments of the present invention includes at least the above-described toner and optionally other components such as a carrier.

Carrier

Specific examples of the carrier include, but are not limited to, a ferrite carrier, a magnetite carrier, and a resin-coated carrier. The resin-coated carrier is composed of a core particle and a covering material that is a resin for covering the core particle. Depending on the surface roughness of the carrier and the content of the covering material, the carrier preferably has a volume resistivity of from $10^6$ to $10^{10}$ Ω·cm The carrier preferably has an average particle diameter of from 4 to 200 μm.

EXAMPLES

Having generally described this invention, further understanding can be obtained by reference to certain specific examples which are provided herein for the purpose of illustration only and are not intended to be limiting. In the descriptions in the following examples, "Part" denotes "parts by mass".

Example 1

Preparation of Toner 1

Preparation of Colorant Dispersion Liquid

A carbon black dispersion liquid is prepared as follows.

First, 6.2 parts of a carbon black (REGAL 400 from Cabot Corporation) and 9.3 parts of a colorant dispersant (RSE-801T from Sanyo Chemical Industries, Ltd.) are primarily dispersed in 84.5 parts of ethyl acetate using a mixer having stirrer blades. The resulting primary dispersion liquid is subjected to a dispersion treatment using a DYNOMILL to more finely disperse the carbon black and completely remove aggregations by application of a strong shearing force. The resulting secondary dispersion liquid is filtered with a polytetrafluoroethylene (PTFE) filter (Fluoropore™ Membrane Filter FHLP09050 available from Nihon Millipore K.K.) having a pore size of 0.45 μm to further disperse the carbon black to submicron range. Thus, a carbon black dispersion liquid is prepared.

Preparation of Toner Composition Liquid

First, 5.6 parts of a wax, serving as the release agent, 72.1 parts of a polyester resin A and 4.4 parts of a crystalline polyester resin A', both serving as the binder resin, 1.4 parts of a charge controlling agent (FCA-N), and 1.0 part of a leveling agent (BYK-306) are mixed and dissolved in 815.5 parts of ethyl acetate using a mixer having stirrer blades at 70° C. After adjusting the temperature of the liquid to 55° C., 100 parts of the carbon black dispersion liquid are mixed therein. An agglomeration and a precipitation of a pigment is not observed. The pigment is uniformly dispersed into ethyl acetate. Thus, a toner composition liquid is prepared.

The wax is a paraffin wax HNP11(available from Nippon Seiro Co., Ltd.) having a melting point of 68.0° C. The polyester resin A is a resin composed of terephthalic acid, isophthalic acid, succinic acid, ethylene glycol, and neopentyl glycol, having a weight average molecular weight (Mw) of 24,000 and a glass transition temperature (Tg) of 60° C. The crystalline polyester resin A' is a crystalline resin composed of sebacic acid and hexanediol, having a weight average molecular weight (Mw) of 13,000 and a glass transition temperature (Tg) of 70° C. The weight average molecular weight (Mw) of the binder resin is determined by subjecting THF solubles in the binder resin to a measurement by a gel permeation chromatographic apparatus GPC-150C (available from Waters Corporation) equipped with Shodex®Columns KF801-807 (available from Showa Denko K.K.) and a refractive index (RI) detector. The boiling point of ethyl acetate is 76.8° C. The charge controlling agent FCA-N is available from Fujikura Kasei Co., Ltd. The leveling agent BYK-306 is available from BYK Japan KK.

Preparation of Mother Toner Particles

A toner is prepared as follows using the toner manufacturing apparatus illustrated in FIG. 8. In this apparatus, a toner composition liquid 25 is supplied to the liquid droplet discharge device 2. Syringe pumps are used as the liquid feeders 27. The liquid droplet discharge device 2 has a liquid discharge head having a cross-sectional view illustrated in FIG. 3A. The measuring conditions are listed below. The temperature of the vessel installed in the toner manufacturing apparatus in which the toner composition liquid 25 are supplied is set to 55° C. After the liquid droplet discharge device 2 discharges liquid droplets, the liquid droplets are dried and solidified by a liquid droplet solidification treatment using dry nitrogen. The conveyance airflow 101 is set to 40° C. The solidified particles are collected by a cyclone collector and fan-dried at 35° C., 90% RH for 48 hours and at 40°, 50% RH for 24 hours. Thus, mother toner particles are obtained. The toner manufacturing apparatus is continuously operated for 24 hours without causing discharge hole clogging.

Manufacture Conditions

Longitudinal length (L) of liquid column resonance liquid chamber: 1.85 mm

Number of discharge holes: 8

Diameter of discharge hole outlet: 10.0 μm

Drying temperature (nitrogen): 60° C.

Drive frequency: 340 kHz Applied voltage to piezoelectric body: 8.0 V

Next, 100 parts of the mother toner particles are mixed with commercially-available silica powders, i.e., 1.0 part of NDK/2000H (from Clariant, Ltd., having an average primary diameter of 19 nm) and 1.0 part of fused silica UFP-35 (from DENKI KAGAKU KOGYO KABUSHIKI KAISHA, having an average primary diameter of 78 nm), and 0.8 parts of titanium oxide JMT-150IB (from TAYCA CORPORATION, having an average primary diameter of 20 nm), using a HENSCHEL MIXER. The mixture is passed through a sieve having an opening of 60 μm to remove coarse particles or aggregations. Thus, a toner 1 is prepared. The composition of the mother toner particles and the external additive of the toner 1 is shown in Table 1.

Preparation of Developer

A developer 1 is prepared by mixing 5 parts of the toner 1 and 95 parts of a carrier prepared in the manner described below with a TURBULA MIXER (from SHINMARU ENTERPRISES CORPORATION).

Preparation of Carrier

A mixture of 100 parts of a silicone resin (organo straight silicone), 100 parts of toluene, 5 parts of γ-(2-aminoethyl) aminopropyl trimethoxysilane, and 10 parts of a carbon black is subjected to a dispersion treatment for 20 minutes using a HOMOMIXER to prepare a coating layer forming liquid. The coating layer forming liquid is applied to the surfaces of 1,000 parts of spherical magnetite particles having a particle diameter of 50 μm using a fluidized-bed coating device. Thus, a magnetic carrier is prepared.

The developer 1 is set in an image forming apparatus and subjected to the evaluations described below. The results are shown in Table 2.

Example 2

Preparation of Toner 2

The procedure for preparation of the Toner 1 is repeated except for replacing the external additive shown in Table 1. Thus, a toner 2 is prepared. The toner 2 is evaluated by the same evaluations as in Example 1.

Example 3

Preparation of Toner 3

The procedure for preparation of the Toner 1 is repeated except for replacing the external additive shown in Table 1. Thus, a toner 3 is prepared. The toner 3 is evaluated by the same evaluations as in Example 1.

Example 4

Preparation of Toner 4

The procedure in Example 1 is repeated except that the BYK-306 is replaced with a BYK-310 (from BYK Japan KK). Thus, a toner 4 is prepared. The toner 4 is evaluated by the same evaluations as in Example 1.

Example 5

Preparation of Toner 5

The procedure in Example 1 is repeated except that the polyester resin A is replaced with 73 parts of the polyester resin A and the leveling agent is replaced with 0.1 parts of the leveling agent. Thus, a toner 5 is prepared. The toner 5 is evaluated by the same evaluations as in Example 1.

Example 6

Preparation of Toner 6

The procedure in Example 1 is repeated except that the polyester resin A is replaced with 71.1 parts of the polyester resin A and the leveling agent is replaced with 2.0 parts of the leveling agent. Thus, a toner 6 is prepared. The toner 6 is evaluated by the same evaluations as in Example 1.

Example 7

Preparation of Toner 7

The procedure for preparation of the Toner 1 is repeated except for replacing the external additive shown in Table 1. Thus, a toner 7 is prepared. The toner 7 is evaluated by the same evaluations as in Example 1.

Example 8

Preparation of Toner 8

The procedure for preparation of the Toner 1 is repeated except for not using the leveling agent and performing surfusion treatment (toner-spheroidizing treatment by high-temperature hot air described in for example JP-2010-134262-A) at 350° C. on obtained toner. Thus, a toner 8 is prepared. The obtained toner can have small specific surface area by surfusion treatment. However, the particle size distribution is broad by a coalescence of the toner particles each other by heat. The toner 8 is evaluated by the same evaluations as in Example 1.

Comparative Example 1

Mother toner particles are prepared by an emulsion method as described below.

Preparation of Fine Particle Emulsion

A reaction vessel equipped with a stirrer and a thermometer is charged with 683 parts of water, 11 parts of a sodium salt of a sulfate of ethylene oxide adduct of methacrylic acid (ELEMINOL RS-30 from Sanyo Chemical Industries, Ltd.), 83 parts of styrene, 83 parts of methacrylic acid, 110 parts of butyl acrylate, and 1 part of ammonium persulfate. The mixture is agitated at a revolution of 400 rpm for 15 minutes, thus preparing a white emulsion. The white emulsion is heated to 75° C. and subjected to a reaction for 5 hours. Further, 30 parts of 1% aqueous solution of ammonium persulfate are added to the emulsion, and the mixture is aged at 75° C. for 5 hours. Thus, a fine particle dispersion liquid that is an aqueous dispersion liquid of a vinyl resin (i.e., a copolymer of styrene, methacrylic acid, butyl acrylate, and a sodium salt of a sulfate of ethylene oxide adduct of methacrylic acid) is prepared. The volume average particle diameter of the fine particle dispersion measured by a particle size distribution analyzer (LA-920 from Horiba, Ltd.) is 105 nm. A part of the fine particle dispersion is dried to isolate the resin component. The isolated resin component has a glass transition temperature (Tg) of 59° C. and a weight average molecular weight (Mw) of 150,000.

Synthesis of Polyester Resin

A reaction vessel equipped with a condenser, a stirrer, and a nitrogen inlet pipe is charged with 229 parts of ethylene oxide 2 mol adduct of bisphenol A, 529 parts of propylene oxide 3 mol adduct of bisphenol A, 208 parts of terephthalic acid, 46 parts of adipic acid, and 2 parts of dibutyltin oxide. The mixture is subjected to a reaction at 230° C. for 8 hours under normal pressures and subsequent 5 hours under reduced pressures of from 10 to 15 mmHg. Thereafter, 30 parts of trimellitic anhydride are added to the vessel, and the mixture is subjected to a reaction at 180° C. for 2 hours under normal pressures. Thus, a polyester resin is prepared. The polyester resin has a weight average molecular weight (Mw) of 6,700, a glass transition temperature (Tg) of 43° C., and an acid value of 20 mgKOH/g.

Preparation of Aqueous Phase

An aqueous phase is prepared by mixing 990 parts of water, 183 parts of the fine particle dispersion, 37 parts of a 48.5% aqueous solution of dodecyl diphenyl ether sodium disulfonate (ELEMINOL MON-7 from Sanyo Chemical Industries, Ltd.), and 90 parts of ethyl acetate. The aqueous phase is a milky whitish liquid.

Synthesis of Low-Molecular-Weight Polyester

A reaction vessel equipped with a condenser, a stirrer, and a nitrogen inlet pipe is charged with 682 parts of ethylene oxide 2 mol adduct of bisphenol A, 81 parts of propylene oxide 2 mol adduct of bisphenol A, 283 parts of terephthalic acid, 22 parts of trimellitic anhydride, and 2 parts of dibutyltin oxide. The mixture is subjected to a reaction at 230° C. for 5 hours under normal pressures. Thus, a low-molecular-weight polyester is prepared. The low-molecular-weight polyester has a number average molecular weight (Mn) of 2,100, a weight average molecular weight (Mw) of 9,500, a glass transition temperature (Tg) of 55° C., an acid value of 0.5 mgKOH/g, and a hydroxyl value of 51 mgKOH/g.

Synthesis of Modified Polyester having Reactive Substituent

A reaction vessel equipped with a condenser, a stirrer, and a nitrogen inlet pipe is charged with 410 parts of the low-molecular-weight polyester, 89 parts of isophorone diisocyanate, and 500 parts of ethyl acetate. The mixture is subjected to a reaction for 5 hours at 100° C. Thus, a modified polyester having a reactive substituent is prepared. The content of free isocyanates in the modified polyester having a reactive substituent is 1.53%.

Preparation of Cyan Master Batch

First, 1,200 parts of water, 270 parts of a colorant C.I. PB 15:3 (from Dainichiseika Color & Chemicals Mfg. Co., Ltd.), 8 parts of a pigment derivative SOLSPERSE 5000 (from The Lubrizol Corporation), and 1,200 parts of the polyester resin are mixed by a HENSCHEL MIXER (from Mitsui Mining & Smelting Co., Ltd.). The mixture is kneaded by a double roll for 30 minutes at 150° C., the kneaded mixture is cooled by rolling and then pulverized by a pulverizer (from Hosokawa Micron Corporation). Thus, a master batch is prepared.

Preparation of Organic Solvent Phase

A reaction vessel equipped with a stirrer and a thermometer is charged with 378 parts of the polyester resin, 110 parts of a carnauba wax, and 947 parts of ethyl acetate. The mixture is heated to 80° C. under stirring, kept at 80° C. for 30 hours, and cooled to 30° C. over a period of 1 hour. Thus, a raw material liquid is prepared. Thereafter, 1,324 parts of the raw material liquid are subjected to a dispersion treatment using a bead mill (ULTRAVISCOMILL (trademark) from Aimex Co., Ltd.) filled with 80% by volume of zirconia beads having a diameter of 0.5 mm at a liquid feeding speed of 1 kg/hour and a disc peripheral speed of 6 msec for 9 hours, to disperse the carnauba wax. The resulting dispersion liquid is mixed with 1,324 parts of a 65% ethyl acetate solution of the low-molecular-weight polyester, 500 parts of the master batch, and 500 parts of ethyl acetate for 1 hour. The mixture liquid is kept at 25° C. and passed through an EBARA MILDER (combination of G, M, S from the entry side) at a flow rate of 1 kg/min for 4 times (4 passes). Thus, an organic solvent phase (colorant wax dispersion liquid) is prepared. The solid content concentration (130°, 30 minutes) in the organic solvent phase is 50%.

Emulsification and Dispersion

A reaction vessel is charged with 749 parts of the organic solvent phase, 115 parts of the modified polyester having a reactive substituent, and 2.9 parts of isophoronediamine (from Wako Pure Chemical Industries, Ltd.). These materials are mixed by a homomixer (TK HOMOMIXER MKII from PRIMIX Corporation) at a revolution of 5,000 rpm for 1 minute. After 1,200 parts of the aqueous phase are added to the reaction vessel, the materials are mixed by the homomixer at a revolution of 9,000 rpm for 3 minutes. The mixture is stirred by a stirrer for 20 minutes. Thus, an emulsion slurry is prepared. The emulsion slurry is contained in a reaction vessel equipped with a stirrer and a thermometer and subjected to solvent removal at 25° C. After the organic solvent has been removed, an aging treatment is performed at 45° C. for 15 hours. Thus, a dispersion slurry is obtained.

Washing Process

First, 100 parts of the dispersion slurry are filtered under reduced pressures.

The resulting filter cake is mixed with 100 parts of ion-exchange water by a homomixer at a revolution of 8,000 rpm for 10 minutes and then filtered, thus obtaining a filter cake (i). The filter cake (i) is mixed with 100 parts of ion-exchange water by a homomixer at a revolution of 8,000 rpm for 10 minutes and then filtered under reduced pressures, thus obtaining a filter cake (ii). The filter cake (ii) is mixed with 100 parts of 10% aqueous solution of sodium hydroxide by a homomixer at a revolution of 8,000 rpm for 10 minutes and then filtered, thus obtaining a filter cake (iii). The filter cake (iii) is mixed with 100 parts of 10% hydrochloric acid by a homomixer at a revolution of 8,000 rpm for 10 minutes and then filtered, thus obtaining a filter cake (iv). The filter cake (iv) is mixed with 300 parts of ion-exchange water by a homomixer at a revolution of 8,000 rpm for 10 minutes and then filtered under reduced pressures. This operation is repeated twice, thus obtaining a filter cake (v). The filter cake (v) is dried by a circulating air dryer at 45° C. for 48 hours and then sieved with a mesh having an opening of 75 μm. Thus, a comparative mother toner 1 (i.e., mother toner particles obtained by an emulsion method) is prepared. Next, 100 parts of the mother toner particles are mixed with commercially-available silica powders, i.e., 1.0 part of NDK/2000H (from Clariant, Ltd., having an average primary diameter of 19 nm) and 1.0 part of fused silica UFP-35 (from DENKI KAGAKU KOGYO KABUSHIKI KAISHA, having an average primary diameter of 78 nm), and 0.8 parts of titanium oxide JMT-150IB (from TAYCA CORPORATION, having an average primary diameter of 20 nm), using a HENSCHEL MIXER. The mixture is passed through a sieve having an opening of 60 μm to remove coarse particles or aggregations. Thus, a comparative toner 1 is prepared. The comparative toner 1 is evaluated by the same evaluations as in Example 1.

Comparative Example 2

Preparation of Comparative Toner 2

The procedure for preparation of the Toner 1 is repeated except for replacing the external additive shown in Table 1. Thus, a comparative toner 2 is prepared. The comparative toner 2 is evaluated by the same evaluations as in Example 1.

Comparative Example 3

Preparation of Comparative Toner 3

The procedure for preparation of the Toner 1 is repeated except for not using the leveling agent. Thus, a comparative toner 3 is prepared. The comparative toner 3 is evaluated by the same evaluations as in Example 1.

Comparative Example 4

Preparation of Comparative Toner 4

The procedure for preparation of the Toner 2 is repeated except for not using the leveling agent. Thus, a comparative toner 4 is prepared. The comparative toner 4 is evaluated by the same evaluations as in Example 1.

Comparative Example 5

Preparation of Comparative Toner 5

The procedure for preparation of the Comparative Toner 1 is repeated except for replacing the external additive shown in Table 1. Thus, a comparative toner 5 is prepared. The comparative toner 5 is evaluated by the same evaluations as in Example 1.

Comparative Example 6

Preparation of Comparative Toner 6

The procedure for preparation of the Comparative Toner 3 is repeated except that the conveyance airflow 101 is set to 40° C. Thus, a comparative toner 6 is prepared. The comparative toner 6 is evaluated by the same evaluations as in Example 1.

Comparative Example 7

Preparation of Comparative Toner 7

40 parts of the polyester resin B, 40 parts of the polyester resin C, 5 parts of a carnauba wax (having an acid value of 4.015 mgKOH/g, a saponification valuea of 9015 mgKOH/g, a melting point of 83° C.), 13 parts of a carbon black (#44 from Mitsubishi Chemical Corporation), and 1 parts of a charge control agent (BONTRON E-304 from Orient Chemical Industries, Ltd.) are melt-kneaded by a single screw extruder. The melt-kneaded product is pulverized after the cooling, and classified. Thus, a comparative mother toner is prepared. Next, 100 parts of the mother toner are mixed with 1.0 part of silica R-972 (from NIPPON AEROSIL CO., LTD.) and 0.5 parts of silica H05TX (from Wacker), using a HENSCHEL MIXER. Thus, a comparative toner 7 is prepared. The comparative toner 7 is evaluated by the same evaluations as in Example 1.

The polyester resin B is a resin composed of fumaric acid, trimellitic acid, bisphenol A propylene oxide adduct, and bisphenol A ethylene oxide adduct, having a weight average molecular weight of 32,000, a glass transition temperature (Tg) of 60° C., an acid value of 28 mgKOH/g and a softening point of 146° C. The polyester resin C is a resin composed of terephthalic acid and bisphenol A propylene oxide adduct, having a weight average molecular weight of 15,000, a glass transition temperature (Tg) of 59° C., an acid value of 15 mgKOH/g and a softening point of 100° C.

Comparative Example 8

Preparation of Comparative Toner 8

The procedure in Comparative Example 3 is repeated except that the polyester resin A is replaced with a RN290 (from Kao Corporation). Thus, a comparative toner 8 is prepared. The comparative toner 8 is evaluated by the same evaluations as in Example 1. The RN290 is a polyester resin composed of fumaric acid, trimellitic anhydride, bisphenol A propylene oxide adduct, and bisphenol A ethylene oxide adduct, having a weight average molecular weight of 80,000 and a softening point of 146° C. The toner composition liquid has high viscosity because the RN290 has a large weight average molecular weight. Therefore, the discharge holes become easy to be clogged. So the productivity decreases than another examples and comparative examples.

Comparative Example 9

Preparation of Comparative Toner 9

The procedure in Example 8 is repeated except that the polyester resin A is replaced with 77.7 parts of the polyester resin A and not using the wax. Thus, a comparative toner 9 is prepared. The comparative toner 9 is evaluated by the same evaluations as in Example 1.

Evaluation Method

Soxhlet Extraction Method 5.0 g of the toner is charged into a cylindrical filter. The toner and the cylindrical filter are weighed. 500 ml of ethyl acetate is poured in a flask arranged to the lowermost part of Soxhlet extractor. The cylindrical filter is attached in middle part of Soxhlet extractor. A condenser is attached to the top part of Soxhlet extractor. The flask is heated by the mantle heater at 90° C. for 24 hours.

Thus, ethyl acetate soluble components of the toner are extracted.

After 24 hours, the cylindrical filter is taken out from Soxhlet extractor.

The cylindrical filter is dried by dryer at 50° C. for 24 hours.

Then, the cylindrical filter containing the residual solid components is weighed.

Thus, the content of the residual solid components can be determined.

A Method for Removing the External Additive (1) Preparation of Surfactant Dispersion Liquid A 500 mL beaker is charged with 5 g of polyoxyalkylene alkyl ether, NOIGEN ET-165 (from DAI-ICHI KOGYO SEIYAKU CO., LTD.), and 300 mL of pure water, followed by dissolving the surfactant by ultrasonic waves, to thereby obtain a mixture of surfactant and water. Next, the mixture of surfactant and water is transferred into a 1000 mL measuring flask and diluted, followed by well-mixing by ultrasonic waves, to thereby obtain a surfactant dispersion liquid.

(2) Preparation of Toner Dispersion Liquid

After placing 50 mL of the surfactant dispersion liquid in a 100 mL screw-cap tube, familiarizing tube internal wall surface with the surfactant dispersion liquid. Next, 3.75 g of a toner is added into the screw-cap tube, followed by rotating calmly the screw-cap tube vertically and horizontally. Next, the screw-cap tube is put in a exclusive jig and the screw-cap tube is stirred for 30 minutes by a ball with rotation speeds of 60 rpm so as to familiarize the toner to the surfactant dispersion liquid. Thus, a toner dispersion liquid is obtained.

(3) Addition of Ultrasonic Waves Energy

The toner dispersion liquid is transferred to a small cup from the screw-cap tube and is given ultrasonic waves energy by Vibracell VCX750 (from Sonics & Materials, Inc.) for 1 minute at 40 W.

(4) Separation of Free External Additive

The resulting dispersion liquid is placed in a 50 mL centrifuge tube, followed by subjecting the dispersion liquid to centrifugal separation for 2 minutes with 2,000 rpm. Next, a supernatant in the centrifuge tube is removed.

(5) Filtration 30 mL of pure water is added in the centrifuge tube. A toner sediment is stirred with a spatula and poured into a funnel. The toner is subjected to vacuum filtration to remove water. 30 mL of pure water is added in the centrifuge tube again. A completely deposited toner is washed away and poured into a funnel. When the toner dries to some extent, the toner is placed in a beaker. 60 mL of pure water is added in the beaker. A resultant is stirred calmly with the spatula and poured into funnel again and removed water. When the toner dries, the toner is placed in an aluminum cup and broken into small pieces with the spatula.

(6) Drying

The toner in the aluminum cup is dried in a thermostatic chamber at 38° C. during one night.

Specific Surface Area

A specific surface area of a toner of examples and comparative examples is measured by the BET method employing nitrogen adsorption. TriStar3000 (from SHIMADZU CORPORATION) is used as a measurement equipment.

Low-Temperature Fixing Property

Each of the developer is set in a modified machine of IPSIO SP C220 (from Ricoh Co., Ltd.) which has been modified such that the temperature of the fixing roller is variable. A solid image having a toner deposition amount of 1.00±0.05 mg/cm$^2$ is formed on a sheet of a paper TYPE 6200 (from Ricoh Co., Ltd.). Each toner sample is fixed on each sheet while varying a fixing temperature from 100° C. with an increment of 10° C. The fixed toner images are rubbed with a hand and observed to determine whether or not the toner has come off. The lower-limit fixable temperature is defined as a temperature below which the toner does not come off when rubbed with a hand.

The lower-limit fixable temperature is graded as follows.

AA: less than 110° C.
A: 110° C. or more and less than 120° C.
B: 120° C. or more and less than 130° C.
C: 130° C. or more A mass % of the Si in the pellet is measured by means of X-ray fluorescence spectrometer ZSX-100e (from Rigaku Corporation). Measurement conditions are as follows.

Measurement Conditions
Tube voltage: 50 kV
Tube current: 10 mA
Detector(Si): PC
Filter: OUT
Spectral crystal (Si): PET Filming Evaluation Method (1) A toner to be evaluated and an image forming apparatus are left to stand for one day in a room having a temperature of 25° C. and a relative humidity of 50%.

(2) All toner contained in a process cartridge unit (PCU) of the image forming apparatus is removed, such that only a carrier is left in the developing device.

(3) To the developing device in which only the carrier is present, is added 28 g of the black toner to thereby produce a 400 g of developer having a toner concentration of 7%.

(4) The developing device is installed in a main body of the image forming apparatus, and only the developing device 61 is idled for 5 minutes at a linear velocity of a developing sleeve of 300 mm/s.

(5) The developing sleeve and the photoconductor are both rotated by trailing at a target linear velocity. A charge potential and a developing bias are adjusted such that an amount of the toner on the photoconductor is 0.4±0.05 mg/cm$^2$.

(6) Under the above-mentioned developing conditions, a transfer current is adjusted such that a transfer rate is 96%±2%.

(7) Entire-surface solid images are continuously output for 10,000 sheets.

(8) The outputted images are subjected to sensory evaluation for image quality, and the number of white voids due to filming is counted. As for the carrier, carrier, which had been installed in the photocopier, is used.

Evaluation Criteria

A case where there is less white missing area is judged as "A," a case where white missing areas are rarely observed is judged as "B", a case where white missing areas are notable is judged as "C," and a case where there are significantly many white missing areas is judged as "D". A or B are judged to be acceptable. C or D are judged to be not acceptable.

Transfer Property

An image forming apparatus Imagio MP 7501 (from RICOH Co., Ltd.) is modified to have a linear speed of 162 mm/sec and a transfer time of 40 msec. Each of the developers is mounted on the above image forming apparatus, and a running test in which a solid image including a toner in an amount of 0.6 mg/cm$^2$ is continuously formed on an A4-size sheet of paper is performed. In the initial stage of the running test and after the 100,000th image is produced, the primary transfer efficiency and the secondary transfer efficiency are calculated from the following equations (7) and (8), respectively.

$$TE1(\%)=T/D\times100 \tag{7}$$

$$TE2(\%)=T-R/T\times100 \tag{8}$$

wherein TE1 and TE2 represent primary and secondary transfer efficiencies, respectively;

D represents an amount of toner particles developed on a photoreceptor;

T represents an amount of toner particles transferred onto an intermediate transfer member;

and R represents an amount of residual toner particles remaining on the intermediate transfer member.

Evaluation Criteria

The primary and secondary transfer efficiencies are averaged and graded as follows.

AA: 90% or more
A: 85% or more and less than 90%
C: less than 85%

The volume average particle diameter (Dv), number average particle diameter (Dn), the model particle diameter and circularity of the toner are measured by a flow particle image analyzer FPIA-3000 (from Sysmex Corporation) A dispersion liquid of a sample is passed through a flow path (extending in a direction of flow) in a flat transparent flow cell (having a thickness of about 200 μm). A stroboscopic illumination and a CCD camera are each located on opposite sides of the flow cell so that an optical path is formed crossing the thickness direction of the flow cell. While the dispersion liquid is flowing, the stroboscopic illumination emits light at an interval of 1/60 seconds to obtain a two-dimensional image of the particles flowing in the flow cell. The two-dimensional image is at least partially parallel to the flow cell. Equivalent circle diameter (Dv, Dn) of each particle is determined from the diameter of a circle having the same area as the two-dimensional image of the particle. Circularity of each particle is determined from the ratio of the perimeter (L) of a circle having the same area as the two-dimensional image of the particle to the perimeter (l) of the two-dimensional image of the particle. As the circularity (i.e., the ratio L/l) approaches one, the particle shape gets close to a true sphere.

The composition of the toner of the examples and the comparative examples are shown in Table 1. The evaluation results are shown in Table 2. In Table 1, "–" represents "being not added". In Table 2, when there are not B nor C, the toner is acceptable.

TABLE 1

|  |  | Example 1 | Example 2 | Example 3 | Example 4 | Example 5 | Example 6 | Example 7 | Example 8 |
|---|---|---|---|---|---|---|---|---|---|
| Toner Composition Liquid | Polyester resin A | 72.1 | 72.1 | 72.1 | 72.1 | 73 | 71.1 | 72.1 | 72.1 |
|  | Crystalline polyester resin A' | 4.4 | 4.4 | 4.4 | 4.4 | 4.4 | 4.4 | 4.4 | 4.4 |
|  | Colorant Dispersion Liquid — Colorant | 6.2 | 6.2 | 6.2 | 6.2 | 6.2 | 6.2 | 6.2 | 6.2 |
|  | Dispersant | 9.3 | 9.3 | 9.3 | 9.3 | 9.3 | 9.3 | 9.3 | 9.3 |
|  | Ethyl acetate | 84.5 | 84.5 | 84.5 | 84.5 | 84.5 | 84.5 | 84.5 | 84.5 |
|  | Wax | 5.6 | 5.6 | 5.6 | 5.6 | 5.6 | 5.6 | 5.6 | 5.6 |
|  | Charge Controlling Agent (FCA-N) | 1.4 | 1.4 | 1.4 | 1.4 | 1.4 | 1.4 | 1.4 | 1.4 |
|  | Leveling Agent BYK-306 | 1.0 | 1.0 | 1.0 | — | 0.1 | 2.0 | 1.0 | — |
|  | Leveling Agent BYK-310 | — | — | — | 1.0 | — | — | — | — |
|  | Ethyl acetate | 815.5 | 815.5 | 815.5 | 815.5 | 815.5 | 815.5 | 815.5 | 815.5 |
| External Additive *1 | HDK/2000H | 1.0 | 0.8 | 0.6 | 1.0 | 1.0 | 1.0 | 0.3 | 1.0 |
|  | UFP-35 | 1.0 | 0.8 | 0.6 | 1.0 | 1.0 | 1.0 | 0.3 | 1.0 |
|  | JMT-150IB | 0.8 | 0.7 | 0.5 | 0.8 | 0.8 | 0.8 | 0.2 | 0.8 |

|  |  | Comparative Example 1 | Comparative Example 2 | Comparative Example 3 | Comparative Example 4 | Comparative Example 5 |
|---|---|---|---|---|---|---|
| Toner Composition Liquid | Polyester resin A | See specification | See specification | 72.1 | 72.1 | See specification |
|  | Crystalline polyester resin A' |  |  | 4.4 | 4.4 |  |
|  | Colorant Dispersion Liquid — Colorant |  |  | 6.2 | 6.2 |  |
|  | Dispersant |  |  | 9.3 | 9.3 |  |
|  | Ethyl acetate |  |  | 84.5 | 84.5 |  |
|  | Wax |  |  | 5.6 | 5.6 |  |
|  | Charge Controlling Agent (FCA-N) |  |  | 1.4 | 1.4 |  |
|  | Leveling Agent BYK-306 |  |  | — | — |  |
|  | Leveling Agent BYK-310 |  |  | — | — |  |
|  | Ethyl acetate |  |  | 815.5 | 815.5 |  |
| External Additive *1 | HDK/2000H | 1.0 | 0.8 | 1.0 | 0.8 | 0.3 |
|  | UFP-35 | 1.0 | 0.8 | 1.0 | 0.8 | 0.3 |
|  | JMT-150IB | 0.8 | 0.7 | 0.8 | 0.7 | 0.2 |

|  |  | Comparative Example 6 | Comparative Example 7 | Comparative Example 8 | Comparative Example 9 |
|---|---|---|---|---|---|
| Toner Composition Liquid | Polyester resin A | 72.1 | See specification | 72.1 *2 | 77.7 |
|  | Crystalline polyester resin A' | 4.4 |  | 4.4 | 4.4 |
|  | Colorant Dispersion Liquid — Colorant | 6.2 |  | 6.2 | 6.2 |
|  | Dispersant | 9.3 |  | 9.3 | 9.3 |
|  | Ethyl acetate | 84.5 |  | 84.5 | 84.5 |
|  | Wax | 5.6 |  | 5.6 | 5.6 |
|  | Charge Controlling Agent (FCA-N) | 1.4 |  | 1.4 | 1.4 |
|  | Leveling Agent BYK-306 | — |  | — | — |
|  | Leveling Agent BYK-310 — | — |  | — | — |
|  | Ethyl acetate | 815.5 |  | 815.5 | 815.5 |

TABLE 1-continued

|  |  |  |  |  |
|---|---|---|---|---|
| External Additive *1 | HDK/2000H | 1.0 | 1.0 | 1.0 |
|  | UFP-35 | 1.0 | 1.0 | 1.0 |
|  | JMT-150IB | 0.8 | 0.8 | 0.8 |

*1 The content of the external additive with respect to 100 parts by mass of the mother toner.
*2 RN270(from Kao Corporation)

TABLE 2

|  | Example 1 | Example 2 | Example 3 | Example 4 | Example 5 | Example 6 | Example 7 | Example 8 |
|---|---|---|---|---|---|---|---|---|
| Soxhlet extraction residual solid components (%) | 11 | 10 | 9 | 11 | 11 | 11 | 8 | 8 |
| BET specific surface area (m2/g) | 2.5 | 2.1 | 1.7 | 2.2 | 2.2 | 2.1 | 2.0 | 2.0 |
| BET specific surface area after liberation treatment of external additive (m2/g) | 0.9 | 0.9 | 1 | 0.8 | 1.1 | 0.7 | 0.9 | 1.1 |
| Average circularity | 0.976 | 0.976 | 0.976 | 0.984 | 0.966 | 0.980 | 0.976 | 0.977 |
| Si (mass %) measured by fluorescent X ray analysis. | 2.0 | 1.8 | 1.6 | 1.9 | 2.0 | 2.0 | 1.0 | 2.0 |
| Number average model particle diameter (μm) | 5.2 | 5.2 | 5.2 | 5 | 5.1 | 5.1 | 5.1 | 5.0 |
| Dv/Dn | 1.08 | 1.08 | 1.08 | 1.09 | 1.09 | 1.09 | 1.09 | 1.20 |
| Filming evaluation | AA | AA | AA | AA | AA | AA | AA | A |
| Transfer Property | AA | AA | A | AA | A | AA | A | A |
| Low-Temperature Fixing Property | AA | AA | AA | A | A | A | AA | A |

|  | Comparative Example 1 | Comparative Example 2 | Comparative Example 3 | Comparative Example 4 | Comparative Example 5 |
|---|---|---|---|---|---|
| Soxhlet extraction residual solid components (%) | 21 | 20 | 11 | 10 | 20 |
| BET specific surface area (m2/g) | 4.0 | 3.5 | 2.9 | 2.6 | 2.8 |
| BET specific surface area after liberation treatment of external additive (m2/g) | 2.6 | 2.6 | 1.6 | 1.6 | 2.6 |
| Average circularity | 0.967 | 0.967 | 0.983 | 0.983 | 0.967 |
| Si (mass %) measured by fluorescent X ray analysis. | 2.0 | 1.8 | 2.3 | 1.8 | 1.0 |
| Number average model particle diameter (μm) | 5.2 | 5.2 | 5.2 | 5.2 | 5.2 |
| Dv/Dn | 1.16 | 1.16 | 1.10 | 1.11 | 1.16 |
| Filming evaluation | A | A | C | B | AA |
| Transfer Property | A | C | A | C | C |
| Low-Temperature Fixing Property | B | A | AA | AA | A |

|  | Comparative Example 6 | Comparative Example 7 | Comparative Example 8 | Comparative Example 9 |
|---|---|---|---|---|
| Soxhlet extraction residual solid components (%) | 11 | 15 | 25 | 8 |
| BET specific surface area (m2/g) | 2.4 | 2.5 | 3.0 | 1.9 |
| BET specific surface area after liberation treatment of external additive (m2/g) | 1.2 | 1.4 | 1.6 | 1.1 |
| Average circularity | 0.990 | 0.955 | 0.971 | 0.986 |
| Si (mass %) measured by fluorescent X ray analysis. | 2.4 | 1.7 | 2.0 | 1.9 |
| Number average model particle diameter (μm) | 5.2 | 5.5 | 5.3 | 5.2 |
| Dv/Dn | 1.10 | 1.14 | 1.11 | 1.13 |
| Filming evaluation | C | A | AA | B |
| Transfer Property | A | A | A | C |
| Low-Temperature Fixing Property | AA | C | C | A |

What is claimed is:

1. A toner, comprising:
   a binder resin that comprises a crystalline polyester;
   a colorant, present in an amount of from 1 to 15% by mass, relative to the total mass of the toner;
   a release agent that comprises a paraffin wax;
   a leveling agent; and
   an external additive, which is at least one member selected from the group consisting of a silica, a titanium oxide, and an alumina,
   wherein the toner has an average circularity of from 0.965 to less than 0.985, and has BET specific surface area of less than 1.20 $m^2/g$ after liberation treatment of external additive,
   wherein the leveling agent is at least one member selected from a silicone-based leveling agent, an acrylic-based leveling agent, a vinyl-based leveling agent and an fluorine-based leveling agent,
   wherein the leveling agent is present in an amount of from 0.1 to 2.0 parts by mass, based on 100 parts by mass of the toner, and
   wherein the release agent has a melting point of from 70 to 140° C.

2. The toner according to claim 1, wherein the toner comprises at most 12% of residual solid components by the Soxhlet extraction method using ethyl acetate as an extraction solvent.

3. The toner according to claim 1, wherein the toner has BET specific surface area of at most 2.50 $m^2/g$.

4. The toner according to claim 1, wherein the toner has Si mass % concentration of at most 2.0 mass % measured by fluorescent X ray analysis.

5. The toner according to claim 1, wherein a particle size distribution Dv/Dn (the ratio of the volume average particle diameter to the number average particle diameter) of the toner is from 1.00 to less than 1.15.

6. The toner according to claim 2, wherein a particle size distribution Dv/Dn (the ratio of the volume average particle diameter to the number average particle diameter) of the toner is from 1.00 to less than 1.15.

7. The toner according to claim 1, wherein the toner has a number average model particle diameter of from 3.0 μm to 7.0 μm.

8. The toner according to claim 1, wherein the binder resin further comprises an organic-solvent-soluble resin other than the crystalline polyester.

9. The toner according to claim 1, wherein the release agent further comprises an organic-solvent-soluble release agent other than the paraffin wax.

10. A developer, comprising:
    the toner according to claim 1;
    and a carrier.

11. The developer according to claim 10, the carrier has a volume resistivity of from $10^6$ Ω·cm to $10^{10}$ Ω·cm.

12. A method of manufacturing the toner according to claim 1, comprising:
    forming liquid droplets by discharging a toner composition liquid in which the binder resin and the release agent are dissolved or dispersed in a solvent;
    and solidifying the liquid droplets into fine particles.

13. The toner according to claim 1, wherein the release agent has a melting point of from 70 to 120° C.

14. The toner according to claim 1, wherein the silica of the external additive comprises silica surface treated with a silane-coupling agent or a silicone oil.

* * * * *